United States Patent [19]

Kawan et al.

[11] Patent Number: 5,572,572
[45] Date of Patent: Nov. 5, 1996

[54] COMPUTER AND TELEPHONE APPARATUS WITH USER FRIENDLY INTERFACE AND ENHANCED INTEGRITY FEATURES

[75] Inventors: Joseph C. Kawan, Hollywood; Melvin M. Takata, Hermosa Beach; Alfred S. Samulon, Malibu; Dilip J. Parekh, Los Angeles; Harvey Marks, Canoga Park; Douglas W. Caruthers, Marina Del Rey; Carol A. Medine, Los Angeles; Truc Nguyen, Cerritos; Lucilla Warren, Santa Barbara; Leslie Moss, Los Angeles; Sarkis A. Merguidijian, Glendale; Morris L. Tucci, Van Nuys; Shan Lee, Hacienda Heights; Jim Vollmer, Culver City, all of Calif.; Leo Ahlin, Etobicoke, Canada; Lawrence D. Weiss, Skaneateles, N.Y.; Leslie Roth, Planview, N.Y.; Kenneth Krieger, Northport, N.Y.; Marjorie Engber, New York, N.Y.; Edward Chin, Long Island City, N.Y.; Robert Haddock, New York, N.Y.

[73] Assignee: Transaction Technology, Inc., Santa Monica, Calif.

[21] Appl. No.: 213,791

[22] Filed: Mar. 16, 1994

Related U.S. Application Data

[63] Continuation of Ser. No. 84,319, Jun. 30, 1993, and Ser. No. 104,931, Aug. 12, 1993, Pat. No. 5,321,840, which is a continuation of Ser. No. 439,739, Nov. 19, 1991, abandoned, which is a continuation-in-part of Ser. No. 260,832, Oct. 21, 1988, Pat. No. 5,008,927, which is a continuation-in-part of Ser. No. 190,440, May 5, 1988, Pat. No. 4,991,199, said Ser. No. 84,319, is a continuation of Ser. No. 433,825, Nov. 9, 1989, abandoned.

[51] Int. Cl.[6] .................................................. H04M 11/00
[52] U.S. Cl. ............................. 379/98; 379/90; 379/96; 379/110; 375/222
[58] Field of Search .................................. 379/93, 96–98, 379/90, 110, 357, 434; 375/222

[56] References Cited

U.S. PATENT DOCUMENTS

| Re. 34,034 | 8/1992 | O'Sullivan . |
|---|---|---|
| D. 202,110 | 8/1965 | Wann . |
| D. 211,253 | 6/1968 | Sundquist . |

(List continued on next page.)

FOREIGN PATENT DOCUMENTS

| 0014313 | 8/1980 | European Pat. Off. . |
|---|---|---|
| 85109734 | 2/1985 | European Pat. Off. . |
| 0181438 | 5/1986 | European Pat. Off. . |

(List continued on next page.)

OTHER PUBLICATIONS

"XC3000 Logic Cell Array Family", Xilinx, no date, pp. 2-1 to 2-20 an 6-1 to 6-40.

(List continued on next page.)

*Primary Examiner*—Wing F. Chan
*Attorney, Agent, or Firm*—Dale Curtis Hogue, Sr.

[57] ABSTRACT

A telephone configures as a programmable microcomputer (telephone-computer) which operates in most circumstances through a standard telephone 12-key keypad input. The telephone-computer has the overall appearance of a telephone and includes telephone electronics and a microprocessor unit operated in conjunction with other computer elements, including memory devices, a programmable gate array (PGA) chip which can be initially programmed and then fixed, and enhanced integrity features. The PGA has the capability of being configured to accommodate various types of software which require different hardware Configuration, but without actually reconfiguring the hardware. The telephone-computer delivers data processing capabilities and services through an ordinary telephone instrument via conventional telephone lines with a network host computer which communicates with a vast panoply of service bureaus. Specifically, operating software is downloaded to the telephone-computer by the network host computer to format the microcomputer to conform to the software format used by the service bureaus.

98 Claims, 17 Drawing Sheets

U.S. PATENT DOCUMENTS

| | | |
|---|---|---|
| D. 227,482 | 6/1973 | Binks . |
| D. 244,617 | 6/1977 | Breger . |
| D. 282,165 | 1/1986 | Brown . |
| D. 282,927 | 3/1986 | Story et al. . |
| D. 284,856 | 7/1986 | Marshall . |
| D. 288,808 | 3/1987 | Asaki et al. . |
| D. 299,030 | 12/1988 | Menn . |
| D. 303,522 | 9/1989 | Meda et al. . |
| D. 304,932 | 12/1989 | Oura et al. . |
| 2,541,270 | 3/1951 | Mitnick . |
| 2,593,475 | 6/1952 | Neilsen . |
| 3,515,814 | 6/1970 | Morgan . |
| 3,596,256 | 7/1971 | Alpert et al. . |
| 3,652,795 | 3/1972 | Wolf et al. . |
| 3,727,186 | 4/1973 | Stephenson, Jr. et al. . |
| 3,760,375 | 9/1973 | Irwin et al. . |
| 3,833,885 | 9/1974 | Gentile et al. . |
| 3,852,571 | 12/1974 | Hall et al. . |
| 3,865,994 | 2/1975 | Bender . |
| 3,932,709 | 1/1976 | Hoff et al. . |
| 3,938,090 | 2/1976 | Borison et al. . |
| 3,956,615 | 5/1976 | Anderson et al. . |
| 3,987,259 | 10/1976 | Larson . |
| 3,995,123 | 11/1976 | Wilson . |
| 4,023,013 | 5/1977 | Kinker . |
| 4,025,760 | 5/1977 | Trenkamp . |
| 4,032,931 | 6/1977 | Haker . |
| 4,071,697 | 1/1978 | Bushnell et al. . |
| 4,075,460 | 2/1978 | Gorgens . |
| 4,091,448 | 5/1978 | Clausing . |
| 4,114,027 | 9/1978 | Slater et al. . |
| 4,185,282 | 1/1980 | Pick . |
| 4,186,438 | 1/1980 | Benson et al. . |
| 4,274,810 | 6/1981 | Meldrum . |
| 4,277,837 | 7/1981 | Stuckert . |
| 4,291,198 | 9/1981 | Anderson et al. . |
| 4,291,199 | 9/1981 | Densmore et al. . |
| 4,301,337 | 11/1981 | Eventoff . |
| 4,313,176 | 1/1982 | Cecil . |
| 4,319,336 | 3/1982 | Anderson et al. . |
| 4,334,126 | 6/1982 | Slingsby . |
| 4,341,951 | 7/1982 | Benton . |
| 4,381,427 | 4/1983 | Cheal et al. . |
| 4,409,450 | 10/1983 | Blades . |
| 4,423,294 | 12/1983 | Walser et al. . |
| 4,425,627 | 1/1984 | Eibner . |
| 4,431,870 | 2/1984 | May et al. . |
| 4,454,414 | 6/1984 | Benton . |
| 4,468,529 | 8/1984 | Sammuel et al. . |
| 4,476,349 | 10/1984 | Cottrell et al. . |
| 4,481,574 | 11/1984 | DeFino et al. . |
| 4,493,021 | 1/1985 | Agrawal et al. . |
| 4,494,194 | 1/1985 | Harris et al. . |
| 4,503,288 | 3/1985 | Kessler . |
| 4,510,351 | 4/1985 | Costello et al. . |
| 4,532,378 | 7/1985 | Nakayama et al. . |
| 4,533,791 | 8/1985 | Read et al. . |
| 4,536,647 | 8/1985 | Atalla et al. . |
| 4,578,174 | 3/1986 | Kato et al. . |
| 4,578,537 | 3/1986 | Faggin et al. . |
| 4,580,011 | 4/1986 | Glaser . |
| 4,585,908 | 4/1986 | Smith . |
| 4,591,662 | 5/1986 | Legros et al. . |
| 4,598,174 | 7/1986 | Pommer, II . |
| 4,604,686 | 8/1986 | Reiter et al. . |
| 4,607,144 | 8/1986 | Carmon et al. . |
| 4,611,277 | 9/1986 | Kemppainen et al. . |
| 4,625,276 | 11/1986 | Benton et al. . |
| 4,629,832 | 12/1986 | Carson et al. . |
| 4,631,666 | 12/1986 | Harris et al. . |
| 4,634,845 | 1/1987 | Hale et al. . |
| 4,649,563 | 3/1987 | Riskin . |
| 4,649,917 | 3/1987 | Furuta . |
| 4,652,704 | 3/1987 | Franklin . |
| 4,653,086 | 3/1987 | Laube . |
| 4,659,876 | 4/1987 | Sullivan et al. . |
| 4,659,879 | 4/1987 | Hasegawa . |
| 4,663,766 | 5/1987 | Bremer . |
| 4,674,115 | 6/1987 | Kaleita et al. . |
| 4,682,014 | 7/1987 | Iwama . |
| 4,683,360 | 7/1987 | Maser . |
| 4,688,170 | 8/1987 | Waite et al. . |
| 4,697,281 | 9/1987 | O'Sullivan . |
| 4,701,845 | 10/1987 | Andreasen et al. . |
| 4,710,955 | 12/1987 | Kauffman . |
| 4,724,521 | 2/1988 | Carron et al. . |
| 4,725,977 | 2/1988 | Izumi et al. . |
| 4,727,243 | 2/1988 | Savar . |
| 4,734,858 | 3/1988 | Schlafly . |
| 4,737,980 | 4/1988 | Curtin et al. . |
| 4,744,103 | 5/1988 | Dahlquist et al. . |
| 4,748,656 | 5/1988 | Gibbs et al. . |
| 4,754,326 | 7/1988 | Kram et al. . |
| 4,788,657 | 11/1988 | Douglas et al. . |
| 4,796,297 | 1/1989 | Okamoto . |
| 4,797,914 | 1/1989 | Vaello . |
| 4,814,972 | 3/1989 | Winter et al. . |
| 4,817,129 | 3/1989 | Riskin . |
| 4,823,264 | 4/1989 | Deming . |
| 4,839,919 | 6/1989 | Borges et al. . |
| 4,850,007 | 7/1989 | Marino et al. . |
| 4,851,994 | 7/1989 | Toda et al. . |
| 4,852,127 | 7/1989 | Fraser et al. . |
| 4,852,151 | 7/1989 | Dittakavi et al. . |
| 4,858,114 | 8/1989 | Heath et al. . |
| 4,860,342 | 8/1989 | Danner . |
| 4,870,677 | 9/1989 | Di Santo et al. . |
| 4,885,580 | 12/1989 | Noto et al. . |
| 4,885,765 | 12/1989 | Shirakawa . |
| 4,897,868 | 1/1990 | Engelke et al. . |
| 4,905,185 | 2/1990 | Fukui . |
| 4,926,325 | 5/1990 | Benton et al. . |
| 4,933,971 | 6/1990 | Bestock et al. . |
| 4,935,870 | 6/1990 | Burk, Jr. et al. . |
| 4,943,995 | 7/1990 | Daudelin et al. . |
| 4,947,028 | 8/1990 | Gorog . |
| 4,951,278 | 8/1990 | Biber et al. . |
| 4,956,852 | 9/1990 | Hodge . |
| 4,958,278 | 9/1990 | Meguro . |
| 4,972,457 | 11/1990 | O'Sullivan . |
| 4,972,463 | 11/1990 | Danielson et al. . |
| 4,982,430 | 1/1991 | Frezza et al. . |
| 4,991,133 | 2/1991 | Davis et al. . |
| 4,991,199 | 2/1991 | Parekh et al. . |
| 4,995,074 | 2/1991 | Goldman et al. . |
| 5,008,927 | 4/1991 | Weiss et al. . |
| 5,008,930 | 4/1991 | Gawrys et al. . |
| 5,012,512 | 4/1991 | Basso et al. . |
| 5,014,190 | 5/1991 | Johnson . |
| 5,018,189 | 5/1991 | Kurosawa . |
| 5,020,100 | 5/1991 | Gardiner . |
| 5,025,373 | 6/1991 | Keyser, Jr. et al. . |
| 5,027,315 | 6/1991 | Agrawal et al. . |
| 5,038,284 | 8/1991 | Kramer . |
| 5,038,372 | 8/1991 | Elms et al. . |
| 5,050,207 | 9/1991 | Hitchcock . |
| 5,058,000 | 10/1991 | Cox et al. . |
| 5,060,152 | 10/1991 | Maeser et al. . |
| 5,065,309 | 11/1991 | Putnam et al. . |
| 5,065,425 | 11/1991 | Lecomte et al. . |
| 5,072,441 | 12/1991 | Szwarc . |
| 5,077,788 | 12/1991 | Cook et al. . |

| | | |
|---|---|---|
| 5,081,673 | 1/1992 | Engelke et al. . |
| 5,103,392 | 4/1992 | Mori . |
| 5,124,909 | 6/1992 | Blakely et al. . |
| 5,127,041 | 6/1992 | O'Sullivan . |
| 5,155,847 | 10/1992 | Kirouac et al. . |
| 5,164,982 | 11/1992 | Davis . |
| 5,175,817 | 12/1992 | Adams et al. . |
| 5,185,742 | 2/1993 | Bales et al. . |
| 5,195,129 | 3/1993 | Yazawa et al. . |
| 5,195,130 | 3/1993 | Weiss et al. . |
| 5,202,825 | 4/1993 | Miller et al. . |
| 5,218,680 | 6/1993 | Farrell et al. . |
| 5,220,501 | 6/1993 | Lawlor et al. . |
| 5,221,838 | 6/1993 | Gutman et al. . |
| 5,227,778 | 7/1993 | Vacon et al. . |
| 5,235,595 | 8/1993 | O'Dowd . |
| 5,245,651 | 9/1993 | Takashima et al. . |
| 5,249,218 | 9/1993 | Sainton . |
| 5,265,033 | 11/1993 | Vajk et al. . |
| 5,276,529 | 1/1994 | Williams . |
| 5,321,840 | 6/1994 | Ahlin et al. . |
| 5,347,632 | 9/1994 | Filepp et al. . |
| 5,383,113 | 1/1995 | Kight et al. . |

FOREIGN PATENT DOCUMENTS

| | | |
|---|---|---|
| 0085482 | 10/1987 | European Pat. Off. . |
| 2309915 | 11/1976 | France . |
| 2632106 | 1/1978 | Germany . |
| 2709461 | 9/1978 | Germany . |
| 3212554 | 10/1983 | Germany . |
| 3423090 | 1/1985 | Germany . |
| 3405448 | 11/1987 | Germany . |
| 54-15606 | 2/1979 | Japan . |
| 57-41723 | 9/1982 | Japan . |
| 63-136758 | 8/1988 | Japan . |
| 1324616 | 7/1973 | United Kingdom . |
| 1528691 | 9/1978 | United Kingdom . |
| 2128447 | 4/1984 | United Kingdom . |
| 2149946 | 6/1985 | United Kingdom . |
| 86/00015 | 8/1986 | WIPO . |
| 87/10256 | 2/1987 | WIPO . |
| 87/01560 | 7/1987 | WIPO . |
| WO88/00371 | 1/1988 | WIPO ............................ G06F 3/023 |
| WO90/06517 | 6/1990 | WIPO ............................ G01P 3/481 |

OTHER PUBLICATIONS

"Class Feature: Calling Number Delivery", Bellcore Technical Reference TR-SY000031, Issue 2, Jun. 1988.
"Programmable Gate Arrays and Self-Diagnosing Hardware", Xilinx, 1989, pp. 6-54 to 6-56.
"QWERTphone—A Low Cost Integrated Voice/Data Terminal", G. G. Durkin, British Telecommunications Engineering, vol. 5, Jan. 1987.
"SPCS Customer Premises Equipment Data Interface", Bellcore Technical Reference TR-SY3000030, Issue 1, Nov. 1988.
"A New Generation of Information Terminals", Cermetek, Apr. 23, 1987.
B. A. Pargh Company Inc. Catalog, Dictograph—Dial-It-Portable Dialer, 1985-86, p. 345.
B. A. Pargh Company Inc. Catalog, Dex-A-Phone—Tray.
"Discovering Direct Access" Citibank, N.A. (1987).
"HomeBase Under Manual," Citibank N.A. (1984).
"The ACH: An Eclusive Dream" *Economic Review* Federal Reserve Bank of Atlanta, vol. LXXI, No. 3, Mar. 1986. p. 4-8.
"Electronic Payment Basics" *Economic Review* Federal Reserve Bank of Atlanta, vol. LXXI, No. 3, Mar. 1986. pp. 9-18.

"ACH Return Items" *Economic Review* Federal Reserve Bank of Atlanta, vol. LXXI, No. 3, Mar. 1986. p. 19.
"Electronic Payments at the Crossroads" *Economic Review* Federal Reserve Bank of Atlanta, vol. LXXI, No. 3, Mar. 1986. pp. 20-33.
"Desiderata for the Viable ACH" *Economic Review* Federal Reserve Bank of Atlanta, vol. LXXI, vol. 3, Mar. 1986.
"Dr. Frankenstein and the ACH" *Economic Review* Federal Reserve Bank of Atlanta, vol. LXXI, No. 4, Apr. 1986. pp. 4-8.
"Corporate Trade Payments: Hard Lessions in Product Design" *Economic Review* Federal Reserve Bank of Atlanta, vol. LXXI, No. 4, Apr. 1986. pp. 9-21.
"Managerial Leadership: A Key to Electronic Payment Success" *Economic Review* Federal Reserve Bank of Atlanta, vol. LXXI, No. 4, Apr. 1986. pp. 22-28.
"Scenirios for the Future of the ACH" *Economic Review* Federal Reserve Bank of Atlanta, vol. LXXI, No. 4, Apr. 1986. pp. 29-50.
Megatel Computer Corporation, "V-40-Based Single-Board Computer Technical Manual", Aug. 1, 1989.
"Displayphone: Telephone and Terminal Combine in a Compact Desk-Top Unit", Adkins et al., Bell-Northern Research, Ltd., 1982, pp. 2-7.
"Electronic Apparatus", Japanese Publication No. vol. .3, No. 36 (P-103), Mar. 27, 1978.
"Intelligent Telephone", IBM Technical Disclosure Bulletin, vol. 23, No. 9, Feb. 1981.
"New Generation Microprocessor for Telecommunication Application," *Proceedings of the IEEE International Conference on Communications, Subhash, Bal, 1980.*
Plessey Publication, "Plessey IBIS Videotex System" (1982).
Plessey Publication, "Plessey Microphone", (1987).
"Plessey Vutel", Plessey Publication No. 7871/6 6/82 5M, 1983.
"The Programmable Gate Array Data Book", Xilinx, 1988, pp. 6-38 to 6-40.
"Programmable Gate Arrays and Self-Diagnosing Hardware", Xilinx, 1989, pp. 6-54 to 6-56.
"Reset Preventing System of Microprocessor", Japanese Publication No. vol. 112 (P-124) (990), Jun. 23, 1982.
"Special Section: The Telephone Becomes an Information Terminal", Commputopia, May 1987, p. 41.
"This Thing Has To Change People's Habits", Forbes, Jun. 26, 1989.
"Understanding Telephone Electronics", Howard W. Swams & Company, Fike, et al., 1980, pp. 119-150.
International Conference on Communications, Jun. 8-12, 1980, pp. 11.5.1-11.5.4.
"8 Banks and Thrifts in 3 States Launch Video Banking Service," *American Banker,* Jun. 9, 1987, pp. 2 and 25.
"Compuserve Home Banking System Offered in Maschusetts, Ohio," *American Banker,* Sep. 22, 1982, p. 9.
"New Jersey Shared ATm Network Will Offer Home Banking Service Through Videx Test," *American Banker,* Jul. 14, 1982, p. 8.
"Electronic Networks Springing Up All Over: Systems Linking Automated Teller Machines, Point of Sale Devices Are Established or Contemplated in Several Areas of The Country," *American Banker,* Mar. 19, 1992, 3 pp.
"Home Banking is Micro Friendly," *American Banker, Jul. 13, 1983,* 2 pp.
"Electronic Banking Heads Toward A Cashless Society," *New Mexico Business Journal,* Jun. 1985, 8 pp.

"Data Networks", D. Bertsekas et al., 1987, 3 pp.

"Airline Credit Union Ready for Takeoff with Electronic and Telephone Banking: Northwest's Far–Flung Employees Will Get Alternatives to Busy Signal" *American Banker,* May 15, 1985, 3 pp.

"Over 100 Shared Automatic Teller Machine (ATM) Networks are Operating in the U.S.," *Economist,* Mar. 27, 1982, 1 p.

"MCI Communications Venture to be Delayed Until Next Year: Company Had Planned to Introduce System Last Month" *American Banker,* Jun. 28, 1984, 2 pp.

"The Delicate Balance of ATM Industry Standards," Levy, J., *The EFT Sourcebook,* 1st Ed., 1988, pp. 35–168, Table 1–4.

"Is Home Banking for Real?" *Datamation,* vol. 32, Sep. 15, 1986, 6 pp.

"Case Study: The Cirrus Banking Network," *Communications of the ATM,* vol. 28, No. 8, Aug. 1985, pp. 798–807.

"NBD Offers Electronic Highway for Network of Shared ATMs", *American Banker,* Apr. 11, 1984, 3 pp.

"Low–Cost Computer Terminal Designed for Home Banking," *American Banker,* Apr. 4, 1984, 2 pp.

"Viewtron Entering Pittsburgh in Deal with Dollar Bank," *Pittsburgh Press,* Aug. 12, 1985, 3 pp.

STATUS FIELD

COMPUTER AND TELEPHONE APPARATUS WITH USER FRIENDLY INTERFACE AND ENHANCED INTEGRITY FEATURES

CROSS-REFERENCE TO RELATED APPLICATIONS

This application is a continuation of Ser. No. 08/084,319, filed Jun. 30, 1993, which is a continuation of Ser. No. 433,825, filed Nov. 9, 1989 (now abandoned); and a continuation of Ser. No. 08/104,931, filed Aug. 12, 1993 (now U.S. Pat. No. 5,321,804), which is a continuation of Ser. No. 07/439,739, filed Nov. 21, 1991 (now abandoned), which is a continuation-in-part of Ser. No. 07/260,832, filed Oct. 21, 1988 (now U.S. Pat. No. 5,008,927), which is a continuation-in-part of Ser. No. 07/190,440, filed May 5, 1988 (now U.S. Pat. No. 4,991,199), all of which are incorporated herein by reference in their entirety.

BACKGROUND OF THE INVENTION

1. Field of the Invention

This invention relates to a remotely reconfigurable user terminal in the form of a telephone-computer specifically designed for use in connection with a distributed data processing system. More particularly, this invention relates to a user terminal intended for use at the home of a bank customer to allow the customer access to the bank's database and operating software, as well as to access other remote data bases and the like. The present invention relates generally to methods for communication between a home microcomputer system and one or more computer networks providing information and financial services. The invention relates more particularly to methods for conducting communications between a home computer system and a generally conventional computer network in an extremely simple manner, such that no knowledge of computer operations is necessary for the user of a home computer system to obtain information or perform financial transactions through the computer network.

2. Related Art

Various firms, including AT&T and Sears, Roebuck & Co., have provided home banking services employing home terminals which communicate with bank service computers. These have either involved "dumb terminals", i.e., terminal devices having no intelligence, or conventional PC's. Nether system is fully user-friendly, as desired according to the invention, since both require some computer literacy on the part of the user.

It will also be appreciated that in recent years banking customers have increasingly become accustomed to using automatic teller machine devices (ATMs). These have been relatively successful because they provide simple and clear "menu" of choices to the consumer at each step of each transaction, such that the customer is very readily led through the sequence of inputs required by the system to respond to the customer's request. It would be desirable if such functions could also be carried out by the consumer in the privacy of his own home, thus rendering the service more convenient and thus more likely to be commonly used. The present telephone-computer was developed exactly for the purpose of providing a readily available user-friendly microcomputer with the familiar appearance of a standard table telephone.

Such automatic teller machines typically operate using software prepared by individual programmers using personal computers. Typically, these personal computers are those manufactured by the IBM Corporation (the "IBM PC") or so-called "clones" thereof. As such, these computers run various software programs which conform to IBM's standards for such personal computers. While such a requirement places various substantial constraints on the computer user, particularly concerning memory access and the like, at this time the IBM "PC" is so thoroughly entrenched throughout industry that it is most unlikely that any change can be made. More particularly, any home terminal or computer intended to be employed with a banking system now operating must emulate the IBM PC "architecture"; further details of this requirement are given below.

To date, substantially all PC's have been configured to comprise a keyboard of between 60 and 101 keys, a display device, and a housing containing the circuit boards of the computer including various interfaces to other devices such as modems for communication, printers and the like. Such PC's, while increasingly popular, still intimidate many potential users. Accordingly, it is an object of the present invention to provide a computer which conforms to the functionality of the PC—that is for example, which runs software developed for banking applications so that it can interface with banking computers, exactly as if it were in fact a conventional PC—while providing a user-friendly, simplified and nonthreatening appearance. In particular, it is desired to place a computer having PC functionality within a package physically resembling an essentially conventional telephone.

It will be apparent to those of skill in the art that the provision of "PC functionality", that is, the ability to run conventional PC software programs without modification to the software, places very substantial constraints on the design of a computer which is to fit within a housing conforming in size and shape to that of conventional telephone. For example, substantially all PC programs are designed to be stored on "floppy disks", or are initially supplied on floppy disks and later copied to a "hard disk". Both of these memory devices require more space than is available in the housing of a conventional telephone. Similarly, the circuit boards used conventionally in PCs are much too large to fit within a conventional telephone, as are the keyboards which are conventionally used. Accordingly, it is not possible to simply shoehorn the normal PC components into a housing resembling a conventional telephone. Moreover, it is desirable in any event to eliminate the use of removable floppy disks and the like from the device provided according to the invention, to simplify its operation and to render it even more user-friendly, and thus accessible to a wider class of possible users.

It is thus essential to achieving the objects of the invention that a computer be provided which can simulate the operation of a system comprising floppy and or hard disk memory devices, as well as other input-output (I/O) devices such as printers and the like, while fitting within the confines of a housing of familiar and nonthreatening appearance, preferably conforming in size and appearance to that of a conventional telephone. Similarly, it is desired that all conventional telephone functions be supported by the user terminal of the invention.

It will also be appreciated that if a home terminal is to provide access to a banking computer to perform financial transactions, a very high degree of security must be built into the system, such that the user cannot corrupt his own or other accounts, cannot withdraw assets from other accounts, and most importantly cannot cause a system error of a type which would cause the entire bank computer system to cease operations, however briefly. To do so means that the home terminal must interact with the network in a sophisticated way. It is also highly desirable that the interaction of terminal and host be amenable to convenient alteration at a later time if it should become necessary.

For example, there have recently been widely publicized instances of "software viruses" which permeate computer networks. The chaos caused in a banking system susceptible to such a virus can hardly be imagined. It is therefore highly significant that the computerized telephone provided to the user by the present invention be updatable with respect to any hardware and software changes which may be required to eliminate the possibility of such bugs or viruses when later developed, and also to be capable of implementing new forms of security such as, for example, data encryption. The prior art teaches no system which provides anything remotely resembling this set of features in a terminal intended for user home use for accessing a banking system.

Megatel Computer (1986) Corporation, of Weston, Ontario, Canada, with which at least one of the inventors named herein is affiliated, has been selling for more than a year prior to the filing date of this application a single board computer which is capable of emulating an IBM Personal Computer and thereby of running conventional software programs intended for use with conventional IBM PCs. This Megatel computer has on its single circuit board a microprocessor, typically a Nippon Electric Corporation (NEC) model V25 or V40, a programmable gate array chip sold by Xilinx Corporation under Model No. XC2018 or the equivalent, both random access memory (RAM) and read-only memory (ROM) and various input-output devices as well as associated connectors and the like. Briefly stated, the use of the programmable gate array to connect the microprocessor to the memory and to the input-output devices has provided this computer with unparalleled flexibility in emulation of the basic functions of an IBM PC, such that it is capable of running substantially all conventional software programs for the IBM PC. This is true even though in many applications the Megatel computer is not connected to external magnetic storage media, printers and the like, and even though the software normally would only run on computers thus configured. To fully understand the significance of this fact, a brief discussion of the IBM PC marketplace is in order.

As a rule, conventional software programs are stated to be "PC-compatible" when they are intended to be run on the IBM Personal Computer (PC). However, not all "PC-compatible" programs will run on all PC's. That is, for example, one program may require a so-called "hard disk" having 40 megabytes storage capacity. Another may require one megabyte of RAM. A third may require an optical disk; a fourth a VGA adapter card, and a fifth, two floppy disks. Thus, "PC-compatibility" only implies with respect to a particular software program that a PC be configured with appropriate optional internal devices and peripherals on which the software will then run; it does not mean that all "PC-compatible" software will run on the same PC.

The basic hardware components of the PC itself, as distinguished from its peripherals, include a microprocessor, a certain amount of read-only and random-access memory ("RAM" and "ROM" respectively), and circuit elements providing logical connection between these various basic components as well as to the keyboard and the display, and to any peripherals such as modems, printers, external memory and the like. The peripherals are normally connected directly to various dedicated "driver" and "interface" chips, which are in turn connected by logic circuit elements to the microprocessor, RAM and ROM. Thus, all PC's require some sort of hardware, i.e., discrete circuit elements, to provide appropriate logical connections to functionally "glue" the microprocessor, RAM, ROM, and the various dedicated input/output devices and peripheral drivers together.

Certain software, referred to as the "BIOS", for Basic Input/Output System, is also essential to provide the "PC architecture". The BIOS provides the interface between the usual PC-compatible software programs (which are also referred to the art as "DOS-compatible", which means that they are designed to work with IBM's Disk Operating System, or DOS; DOS is thus only useful if the BIOS and BIOS-compatible hardware are already in place) and the actual hardware elements. The hardware elements, plus the BIOS, thus form the basic 'PC architecture'.

In the IBM PC itself, a custom designed "gate array" chip is normally used to provide the logical connection between the microprocessor, the RAM and ROM, and the various dedicated input/output and peripheral driver elements. Various others have provided these functions using so-called programmable logic array (PLA) chips. Such PLA chips comprise a number of predefined but not preconnected logic gates on a chip. Connections are established by fusing fusible links disposed on the chip. Having thus been programmed, the PLA circuitry cannot be further altered.

The BIOS used by Megatel in this computer is also commercially available. The "glue" required to functionally connect the microprocessor, the memory, and the input-output chips is provided by configuring the PGA chip by supply of a series of signals, referred to by Xilinx as "configuration programs" and sometimes herein as "configuration code" or "configuration software". Essentially, this configuration code defines the logical connection of various basic logic elements on the PGA chip.

A significant advantage is provided by use of his chip, in that by supply of new configuration code, changes can be made to the hardware connecting the microprocessor to the memory and the input-output chips on the circuit board. Thus, for example, if a particular hardware change needs to be made to accommodate a particular software program, this can be done readily by simply supplying reconfiguration code appropriately to the PGA chip and reconfiguring it before the software is to be run. Similarly, use of the PGA chip in many cases will allow reconfiguration of the hardware to support new peripherals—e.g., an enhanced-resolution display, an optical disk storage device, so-called "smart" or debit-card readers, or the like, which in other systems would normally require the physical addition of a new circuit board or the like.

Use of the PGA chip has extremely powerful and extensive implications. For example, a piece of software running on a IBM PC operates properly when it "receives" an appropriate sequence of signals from the microprocessor in response to the signals it "generates". For example, a microprocessor may be directed by software to send a certain data item to a floppy disk for storage. The floppy disk controller responds to such a request with a predetermined acknowledgement signal; when this signal is received by the software, it then performs a subsequent function. Accordingly, if the PGA chip is configured to respond to a particular signal provided by the software with the proper acknowledgement signal, the software can be "fooled" into thinking the PC is configured with certain peripherals when in fact none is provided. Thus, to provide "software-compatibility" the PGA chip need simply be configured to respond to a known sequence of signals with a corresponding sequence of response signals, thus fooling the software into thinking it is running on a properly configured PC.

The Xilinx "Programmable Gate Array Data Book" (1988) discusses at pages 6–38–6–40 use of this technology for "Self-Diagnosing Hardware", suggesting that the device "... can perform diagnostic functions at power-up, or in test modes, and perform normal functions where the board is determined to be operational." It is specifically suggested that this will be particularly useful for testing peripheral control logic using loopback techniques, I/O and memory error detection circuitry, and interrupt techniques.

As mentioned above, Megatel has been using the programmable gate array technology to emulate a PC. However, to the best of the inventors' knowledge, there has to date been no application of this PGA technology to the specific problem of providing a home user terminal for accessing a bank system as well as other computer systems, all as discussed above. Nor (again, to the best of the inventors' knowledge) has there been any use of this PGA technology to physically emulate a telephone while providing various functions of a typical personal computer. Moreover (again to the best of the inventors' knowledge), there has been no implementation of a home computer in which some portion of the hardware is defined by configuration code supplied to a programmable gate array, much less one which can be remotely reconfigured, e.g. so as to cure a "hardware virus", to provide an updated user function, to provide an improved security function such as data encryption, or otherwise to reconfigure the logic of a terminal once installed in the user's home.

Use of microprocessors for telecommunications applications is known in the art, as shown by Subhash Bal, "New Generation Microprocessor for Telecommunication Applications." *Proceedings 1980—International Conference on Communications*, Seattle, Wash., (Jun. 8–12, 1980) pages 11.5.1–11.5.4. Additionally, microprocessors have been used as control apparatus for a number of communication system administration functions and in switching systems as shown in U.S. Pat. No. 4,580,011 to Robert E. Glazer, issued Apr. 1, 1986 and U.S. Pat. No. 4,629,832 to Robert A. Carson et al, issued Dec. 6, 1986. It is known that, to increase system integrity, the administration functions in a telephone network can be controlled by a microprocessor to facilitate the interaction of a private branch exchange or similar telephone network with a telephone central office. It is also known that telephone protection functions can be performed through a microprocessor. Operation of computers with simple interfaces and the connection of several computers to a host computer in a network through modems is also known in the prior art. However, the prior art does not teach the use of a microprocessor controlled primarily through a 12-key keypad of a normal telephone device where the keypad also operates a stand-alone telephone unit and additionally provides user interface to the microprocessor.

SUMMARY OF THE INVENTION

The microcomputer with simplified user interface of the present invention is incorporated in a small desk-top housing which has the general appearance of a standard desk telephone. The present telephone-computer in accordance with the present invention includes four basic components which cooperate together to provide improved telephone and computing functionality. These basic components include (1) a primary microprocessor including a central processing unit (CPU), memory elements associated with the CPU and certain hardware integrity features protecting the CPU; (2) a Programmable Gate Array (PGA) comprising a logic cell array which provides the means for dynamically reconfiguring the basic architecture and control logic of the primary microprocessor; (3) telephone electronics comprising (i) a manual telephone circuit including a dialer, speech network and ring detector powered by the telephone line voltage, (ii) a keyboard/keypad microprocessor receiving input from a telephone keypad and a keyboard input device and associated hardware to provide an interface between the telephone operation of the device and the primary microprocessor; and (4) a modem for data transfer to and from the primary microprocessor over the telephone line.

The telephone elements of the device are operated from a conventional 12-key telephone keypad through the telephone electronics of the device and perform normal telephone functions. The telephone electronics may also provide inputs through a keyboard microprocessor to the central processing unit of the primary microprocessor and its extensive memory. An additional 52-key keyboard in the QWERTY format, normally hidden in the telephone housing, provides additional inputs to the central processing unit of the primary microprocessor through the telephone electronics. Inputs to the primary microprocessor may, in the alternative embodiment, be provided by a programmable function key.

The primary microprocessor in conjunction with a multipurpose graphics display controller provides an output to a small display device such as a liquid crystal display (LCD) or a small cathode-ray tube display device mounted in the housing of the device for viewing by the operator. However, the programmable gate array can also be readily reprogrammed to drive other sorts of displays such as conventional EGA or CGA monitors, plasma displays or the like. In some case it may be desired to employ a further additional display driver chip, which itself provides certain display driver modification possibilities. Again, the reconfigurability of the programmable gate array allows very substantial flexibility in use of the device according to the invention.

The primary microprocessor itself is connected to the telephone line through a modem and, thus, is capable of dialing and communicating with other parts of a computer network. The primary microprocessor may be programmed to incorporate dedicated software functions including a record manager for reading and writing data, such as records, into the primary microprocessor memory, a telephone list, activity log, a user configuration record and a diagnostic log. The logs may be sent to another computer via telephone line for further processing. The primary microprocessor includes certain software diagnostics which control the microprocessor's status and provides for overall microprocessor protection. The primary microprocessor is also connected to a modem which permits the transfer of data from the primary microprocessor over the telephone line.

The primary microprocessor is a general purpose computer and may be programmed in any standard manner. The primary microprocessor can be programmed to include certain fixed functions as will be explained in detail below. One application program usable on the primary microprocessor is implemented using a software language designated Home Access Language (HAL). The application program is formatted in logic pages. A page includes screens to be displayed on the LCD display and logic associated with specific operations described on the screens. The application program written in HAL is compiled into pseudo-code on a mainframe computer and is translated into an executable format by a HAL interpreter incorporated in the 256K byte ROM. The application program, when incorporated in the primary microprocessor, permits it to receive input from the keyboard microprocessor and the modem and to perform certain programmed functions as explained below. More specifically, the program "pages" supply the telephone-computer with sufficient "prompts" to elicit from the user whatever information—user codes, desired transactions, and the like—is required to access one of a plurality of service computers to which the network host computer is connected by conventional telephone lines. The telephone-computer communicates with the network host computer via a message having a first protocol. The network host computer transforms this information into whatever second protocol is conventionally required to communicate with the service computer.

One object of the invention to provide a device with the features of a computer, housed in a unit which appears to the user to be no more complex than an ordinary telephone.

Another object of this invention to provide a user friendly microprocessor controlled for most operations through the 12-element keypad of a normal telephone.

Another object of this invention to provide a highly capable computer usable as a telephone and also responsive to the user's commands made through the keypad.

It is another object of this invention to provide a microprocessor with enhanced integrity features allowing for an improved interaction with telephone electronics and other input devices.

Another object of the invention is to allow a network host computer to download program pages which are compatible with the present telephone-computer or a PC to access a variety of different information and financial services which communicate with the network host computer via conventional telephone lines in languages which are compatible with the normal information and financial services, but which are not compatible with the present telephone-computer or the PC.

Yet another object of the invention is to provide a telephone configured as a reconfigurable general purpose computer which may be reconfigured on site or remotely.

Features and advantages of the present invention will be better appreciated from the detailed description below, taken in conjunction with the attached drawings.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

Figure 1:
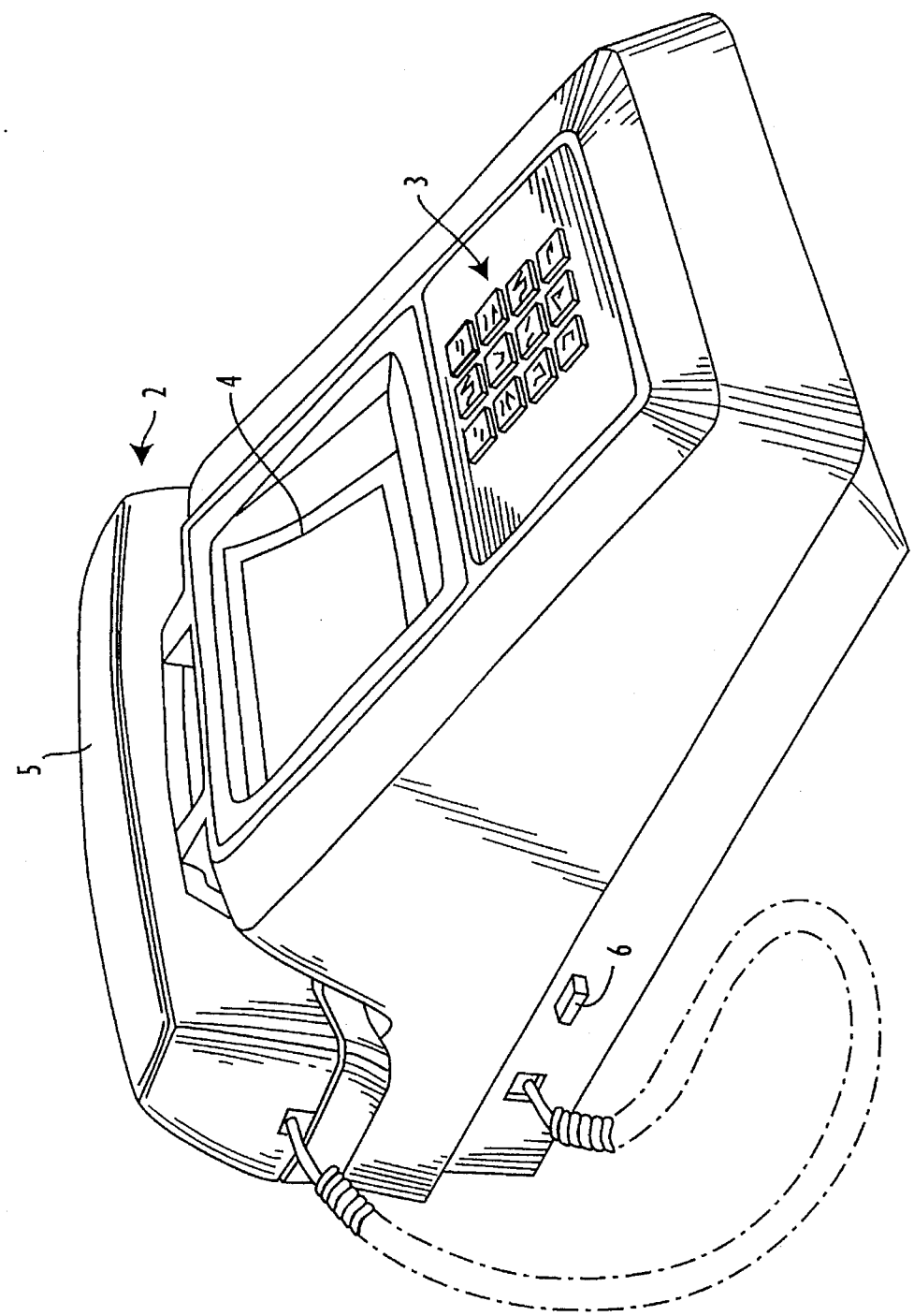
FIG. 1 is a front perspective view of a first embodiment of the telephone-computer in accordance with the present invention.
Figure 2:
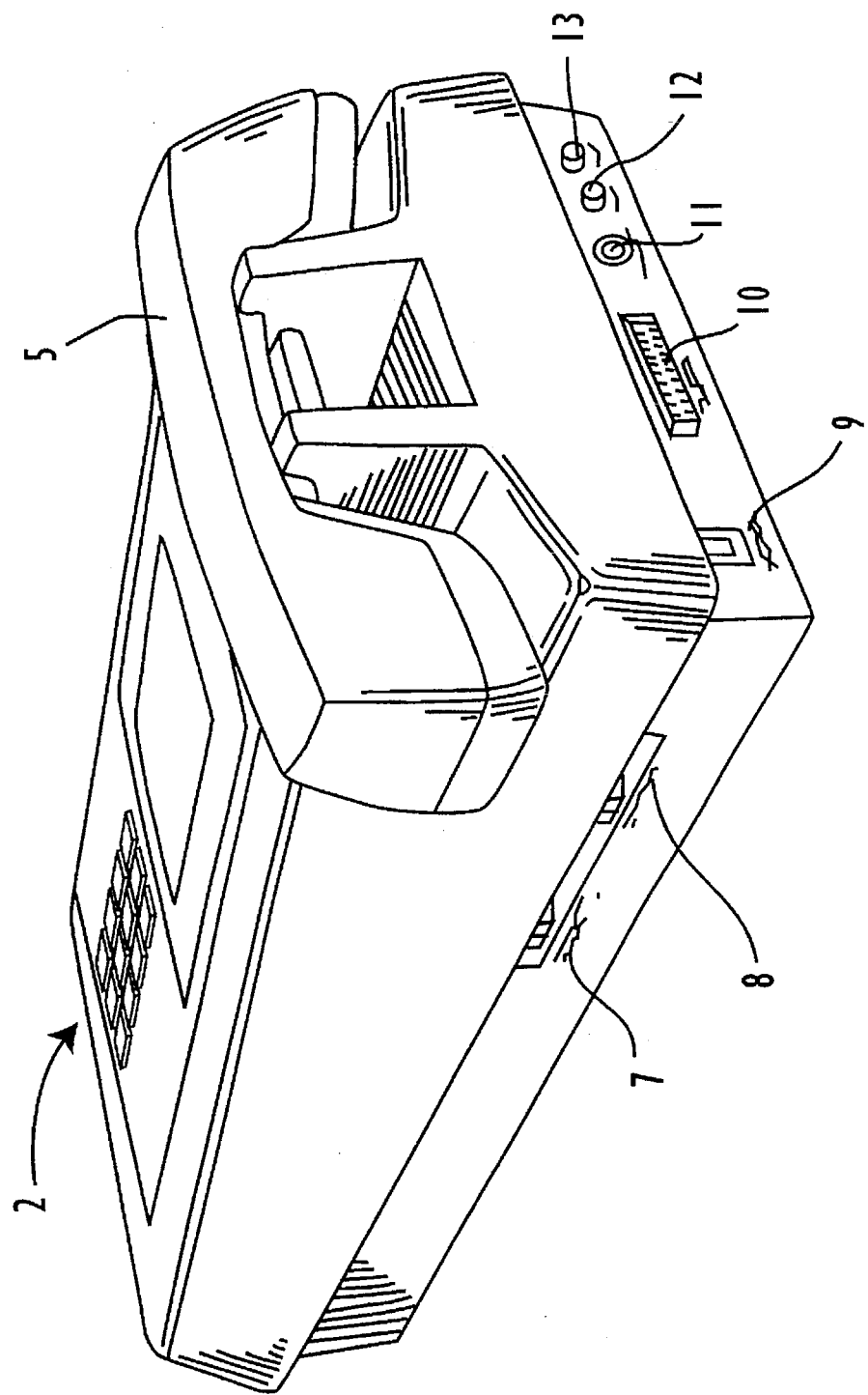
FIG. 2 is a rear perspective view of the telephone-computer of FIG. 1.

Referring to FIGS. 1 and 2, the telephone-computer device of the present invention has the overall appearance of a conventional desk-top telephone unit. The present telephone-computer invention is incorporated in a telephone housing so that it presents to a technically unskilled operator a format with which he or she is familiar, i.e. a conventional telephone. The telephone-computer device of the present invention may be incorporated in a wall telephone or any other conventional telephone format. The invention is designed to operate both as a standard telephone unit and as a microcomputer in a computer network.

Referring to FIG. 2, the housing for the invention further includes controls 12 and 13 for the display 4, an accessories port 10 (to support printing or initial speed loading of the RAM), a connection 9 to a telephone line, controls 7 and 8 for the telephone speaker and ringer, and a control 6 for the telephone dialer (selection of pulse or tone), and is located on the bottom of the telephone-computer device.

Figure 6:
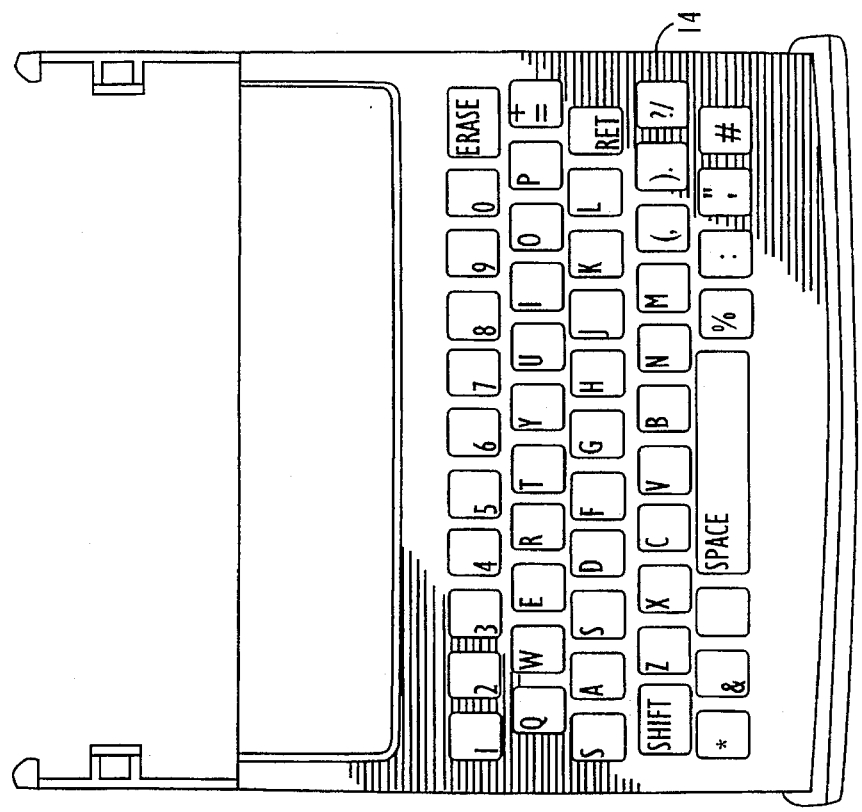
FIG. 6 is a plan view of the access drawer having a QWERTY 52-key keyboard of FIG. 5.
Figure 5:
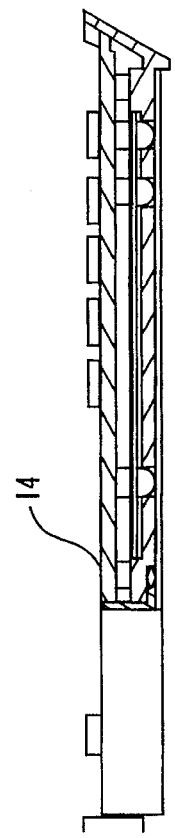
FIG. 5 is a side view of an access drawer having a QWERTY 52-key keyboard.

The telephone-computer of the present invention includes a primary microprocessor and associated memory, and is designed to have a simplified user interface. The interface is operated through the telephone unit using the 12-key keypad 3 of the telephone. One key of the 12-key keypad is designated a HELLO key and activates the primary microprocessor control of the telephone as explained below. The telephone keypad 3 activates either tone or pulse dialing functions for the electronics of the telephone incorporated in the device and also provides input through a keyboard/keypad microprocessor to the primary microprocessor element of the invention. The primary microprocessor may also receive input through the keyboard/keypad microprocessor from a 52-key keyboard 14 shown in FIGS. 5 and 6. This board has a QWERTY format and is normally hidden from view. The user interface also includes a display 4 which receives its input directly from the microprocessor via a multipurpose graphics display controller. Preferably, the display 4 is a flat panel liquid crystal display (LCD). However, as described below, the programmable gate array can also be readily reprogrammed to drive other sorts of displays such as conventional EGA or CGA monitors, plasma displays or the like. In some cases it may be desired to employ a further additional display driver chip, which itself provides certain display driver modification possibilities. Again, the reconfigurability of the programmable gate array allows very substantial flexibility in use of the device according to the invention.

Figure 3:
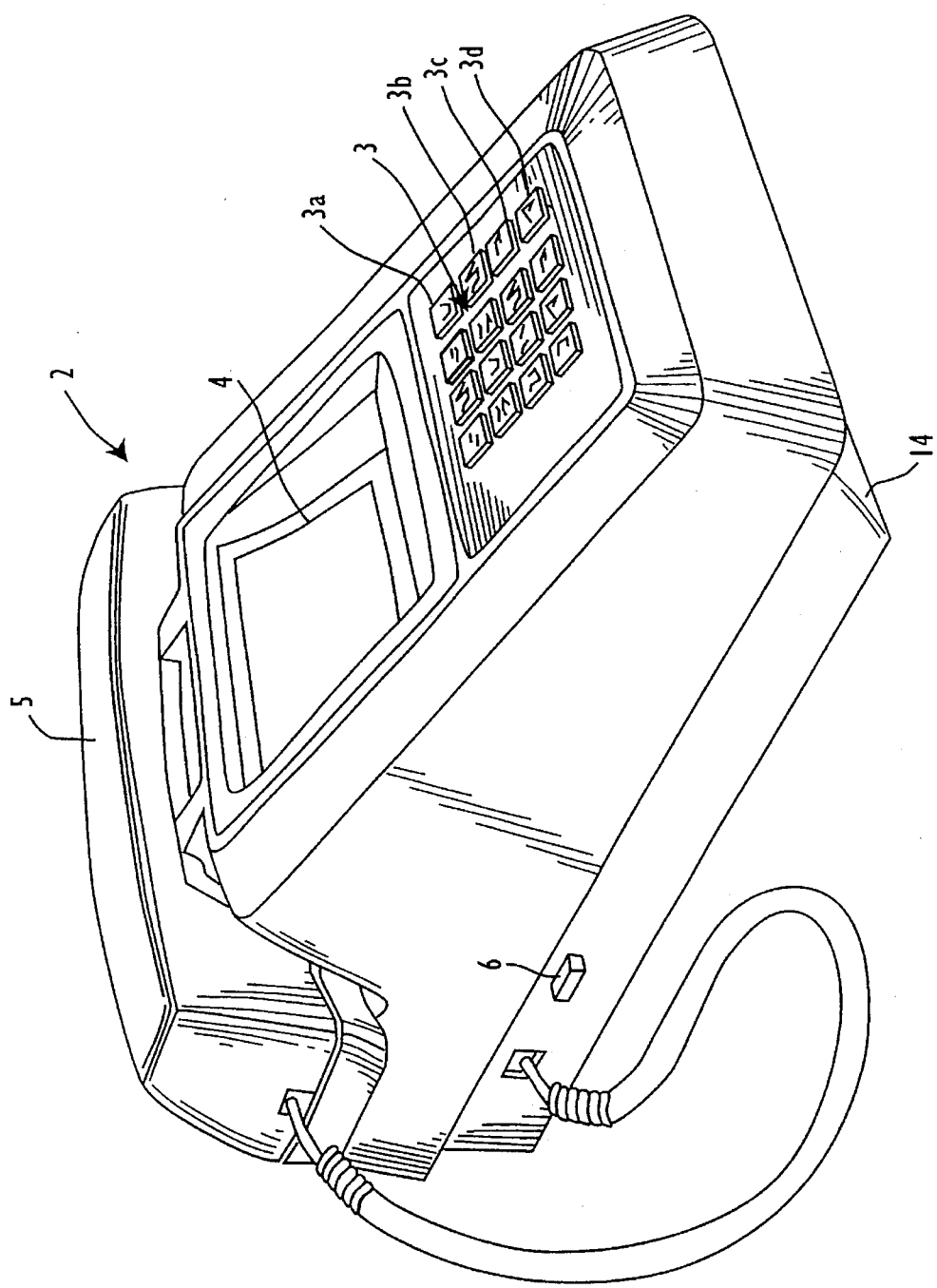
FIG. 3 is a front perspective view of a second embodiment of the telephone-computer in accordance with the present invention.
Figure 4:
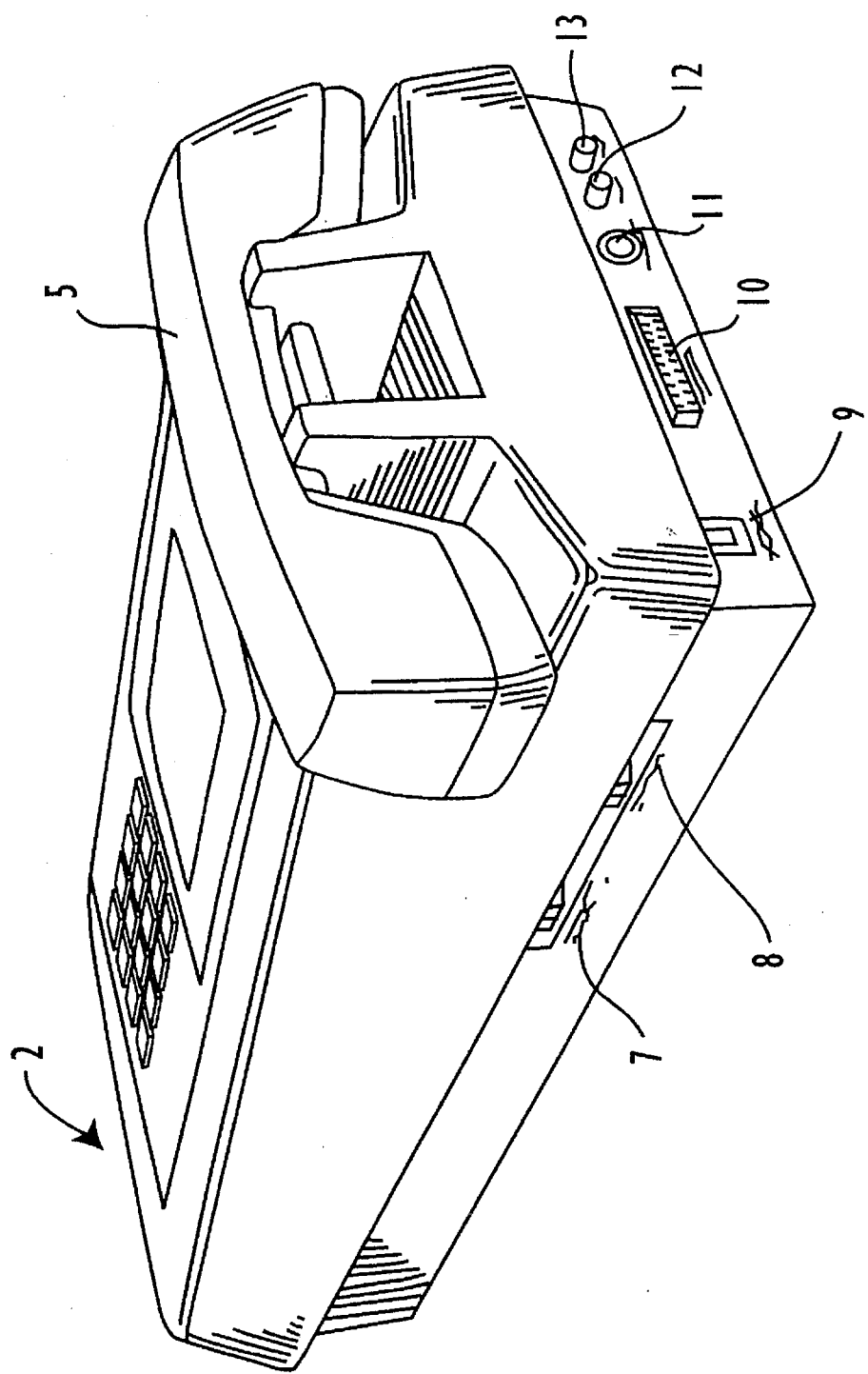
FIG. 4 is a rear perspective view of the telephone-computer of FIG. 3.

FIGS. 3 and 4 disclose an alternative embodiment of the invention in which the 12-key keypad is augmented by four function keys 3a, 3b, 3c, and 3d. In this alternative, one of the function keys is a service key which performs the functions of the HELLO key in the preferred embodiment. The other function keys are programmable and may perform the standard functions of speed dial, flash or redial.

Figure 7:
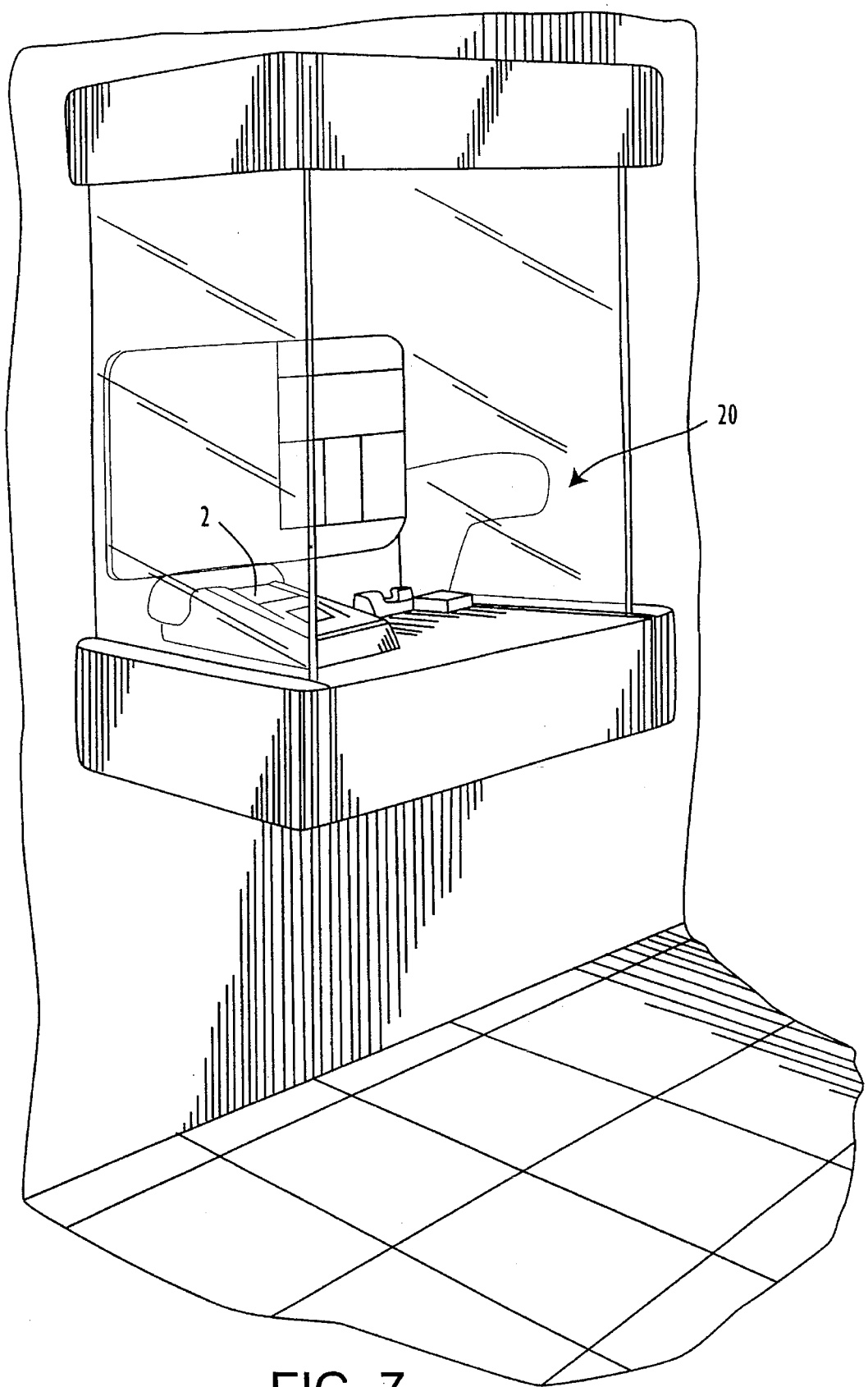
FIGS. 7 and 8 are perspective and plan views of the invention as used in a public booth deployed with peripheral equipment.
Figure 8:
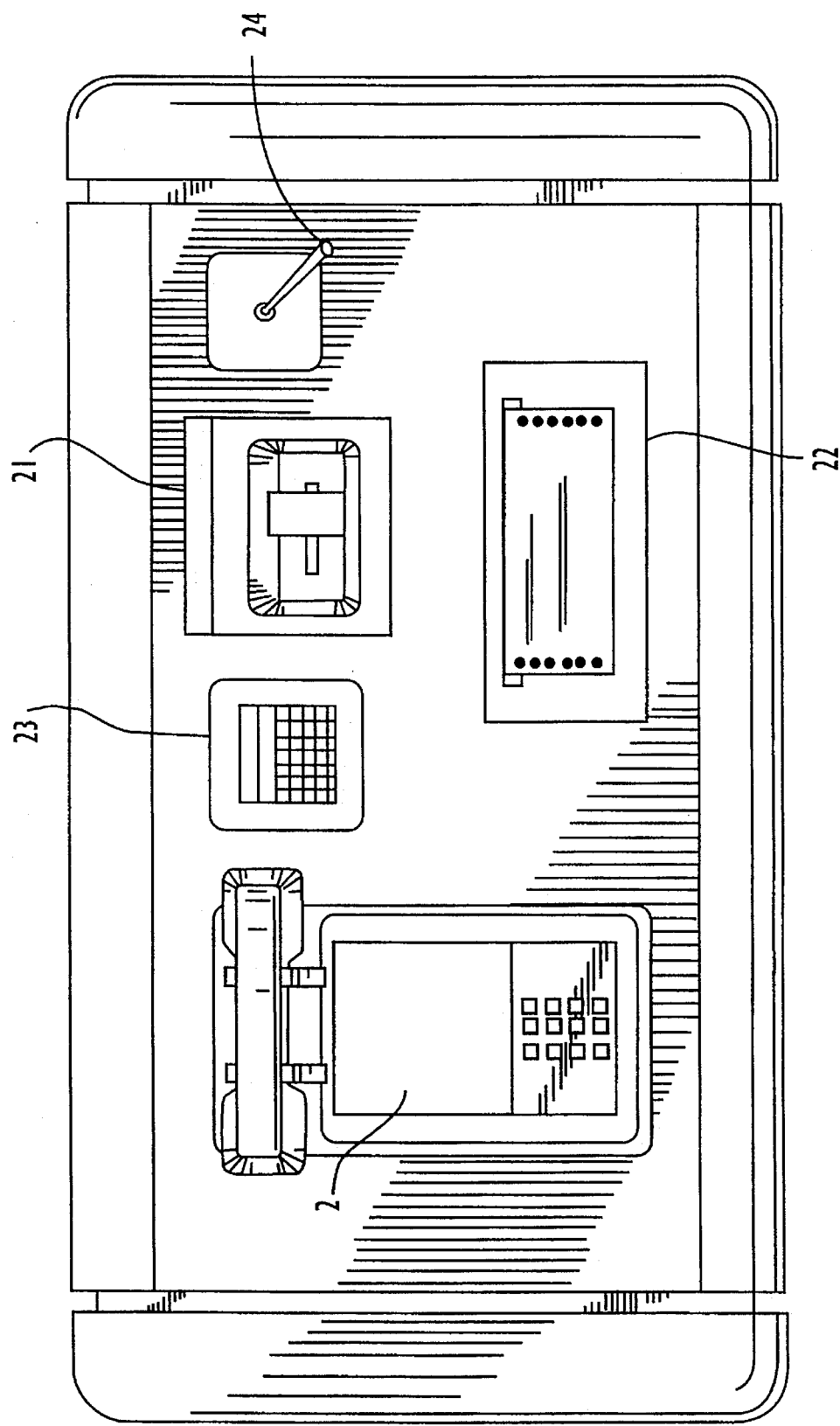

The device may be operated at a public booth 20 as shown in FIGS. 7 and 8. In this configuration, the apparatus of the invention is placed in a form fitted hole in a counter top with only the upper housing visible. The device is deployed with several peripheral items in close proximity in a user-friendly arrangement. The peripheral items which are connected to the apparatus of the invention include a card reader 21 for reading magnetic information imprinted on cards and a printer 22 capable of printing transaction journals. Other items connected to the apparatus in this configuration, but which are not user-visible, are (1) an attachment called an expansion box for converting signals coming out of the connector on the back of the apparatus, allowing for card reader and printer connection, (2) two floppy disc drives for expanded software and (3) an external power supply to drive the card reader and disc drives.

Figure 9:
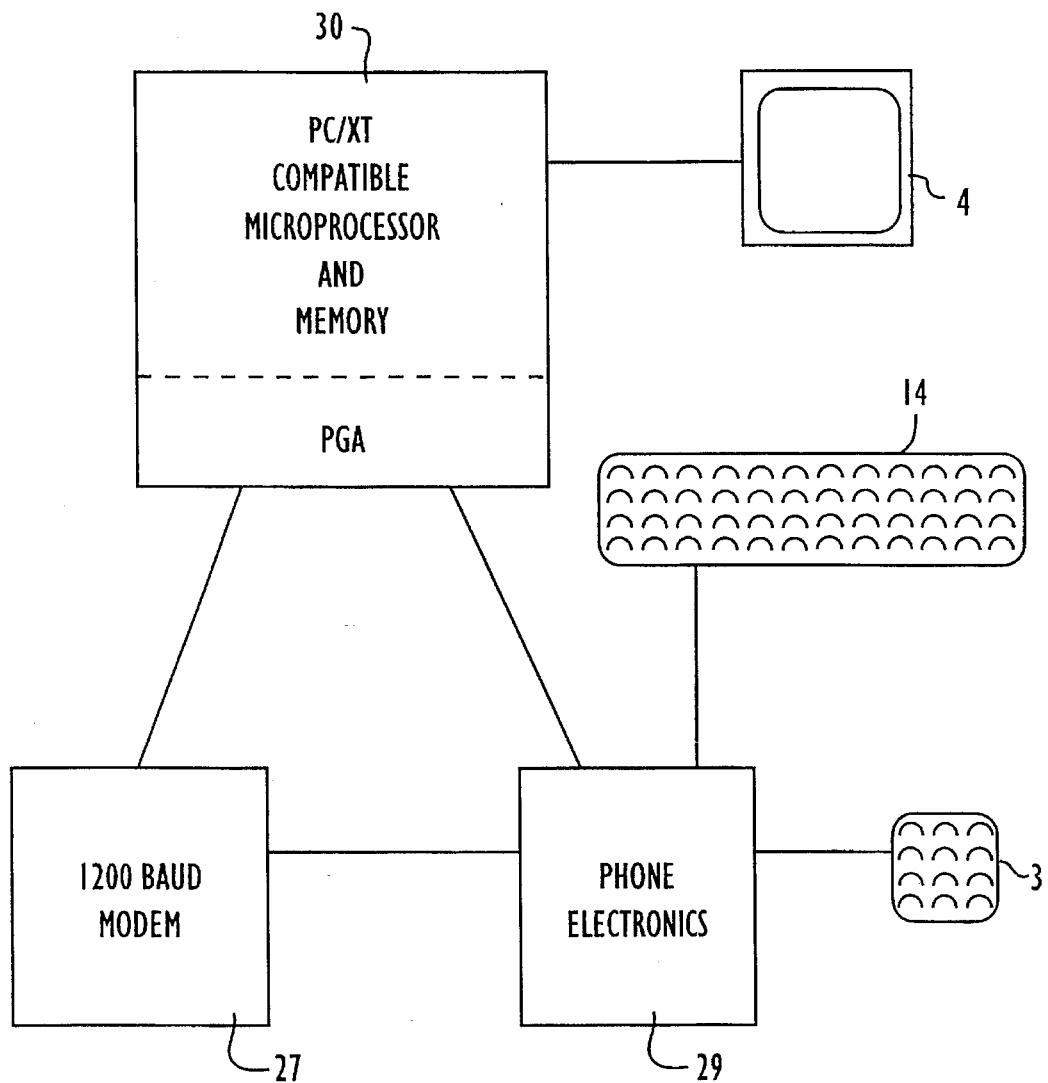
FIG. 9 depicts in block diagram format the functional components of the telephone-computer of the invention.

FIG. 9 depicts the basic structure of the hardware of the telephone-computer unit. As stated above, the device of the invention includes four basic elements (1) the telephone electronics, generally indicated at 29, (2) a programmable gate array (PGA), generally indicated at 30, (3) a primary microprocessor with memory, also generally indicated at 30, and (4) a modem 27. The telephone electronics provides input to the primary microprocessor of the invention and also acts as a telephone. The primary microprocessor itself includes an 8086 compatible central processing unit and is compatible with the standard International Business Machine (IBM) PC/XT at the BIOS level.

Figure 15:
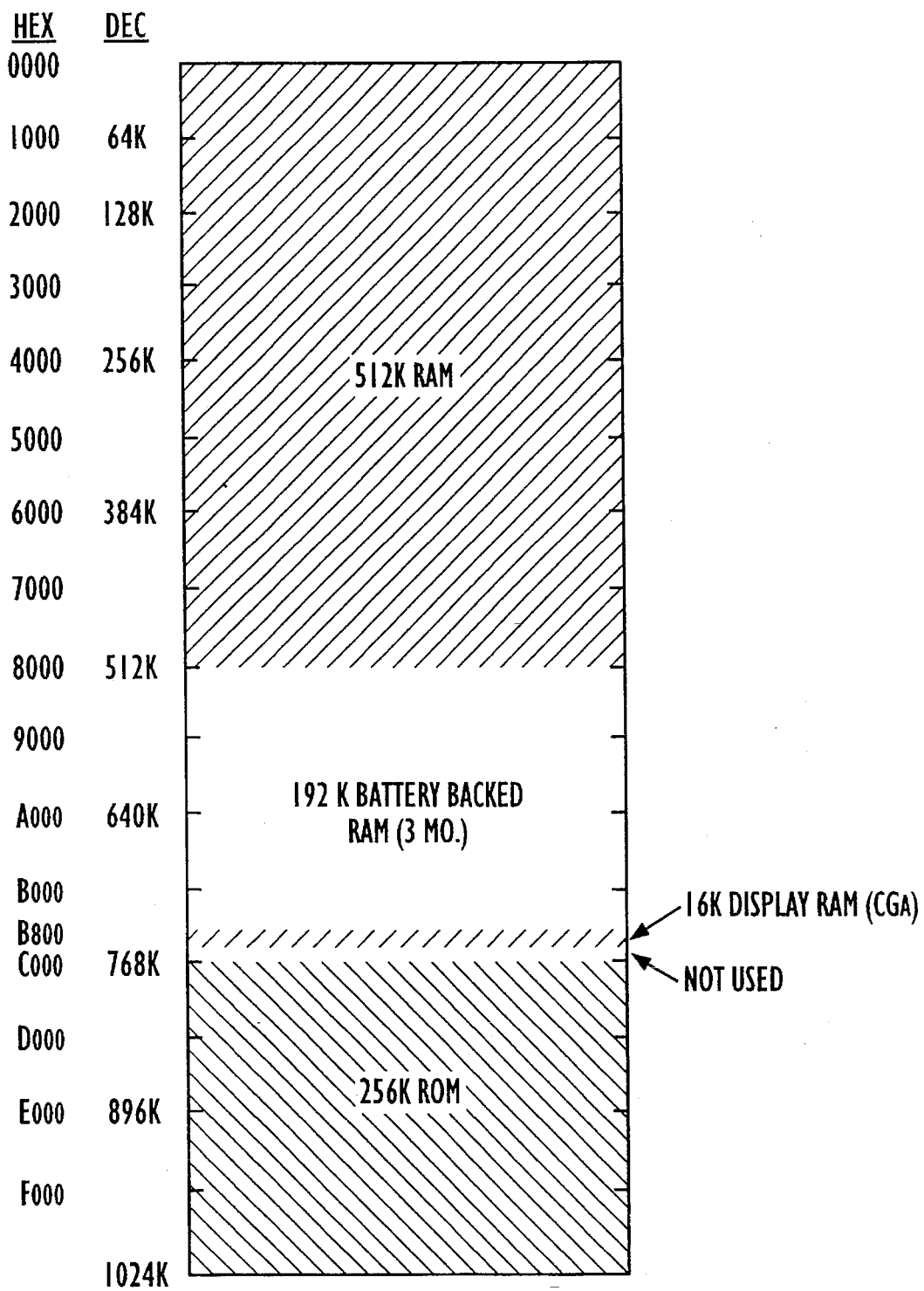
FIG. 15 is a memory map of the memory elements of the primary microprocessor of the telephone-computer of the invention.

A map of the primary microprocessor memory of the telephone-computer is shown in FIG. 15. The microprocessor includes six-memory units, a volatile writable 512K byte RAM memory, a non-volatile writable 192K byte RAM memory with battery backup protected for a specified period, a 256K byte non-volatile non-writable ROM memory, an 8K byte character generator ROM memory and a 16K byte display memory for interface with the display. The volatile RAM memory is intended for holding microprocessor program information and other data. The display is controlled by a multipurpose graphics display controller which can provide black and white or color CRT or drive an LCD display panel. The primary microprocessor memory may include a 32K byte electrically erasable programmable read-only memory (EEPROM) or a static RAM memory with ten-year built-in battery protection for recording user information such as telephone numbers and addresses.

Figure 10:
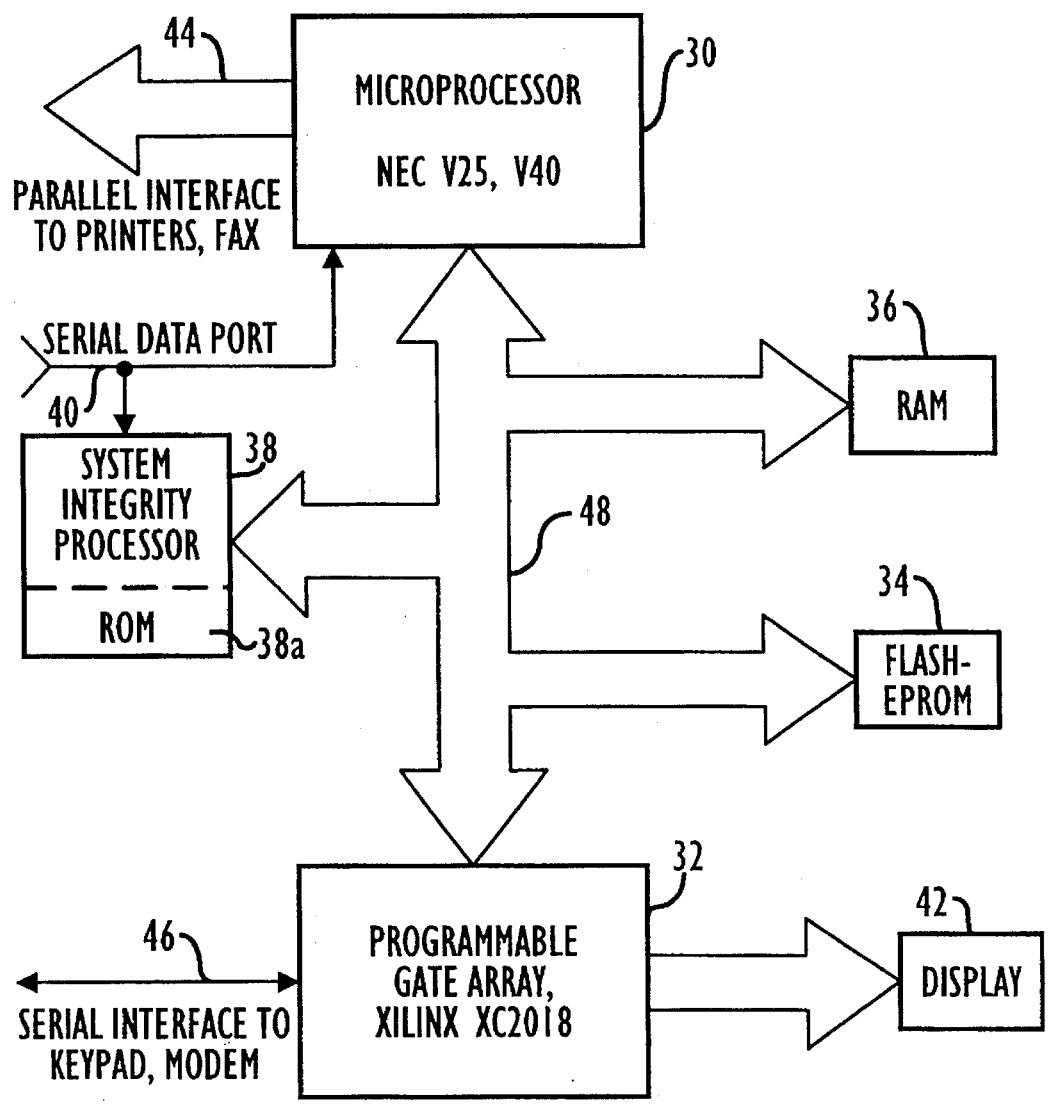
FIG. 10 depicts in block diagram format principal semiconductor components utilized in the telephone-computer of the invention.
Figure 11:
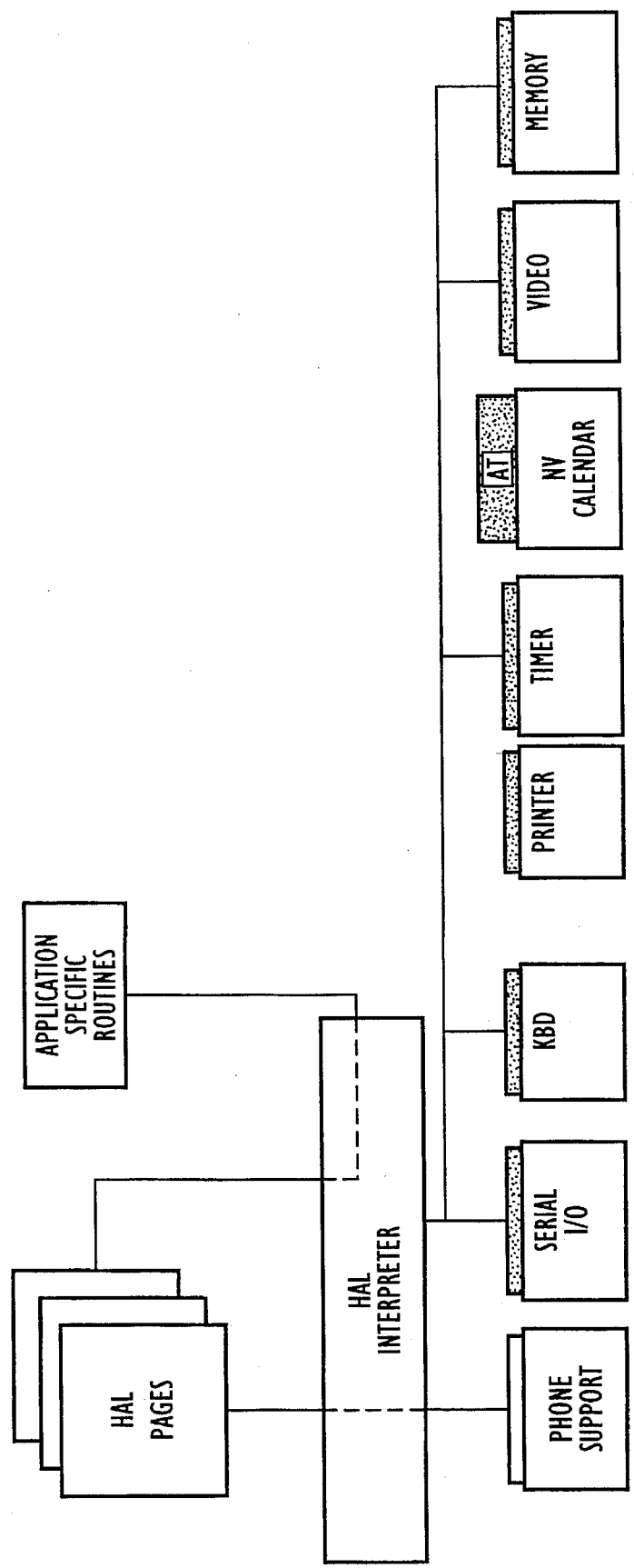
FIG. 11 depicts in block diagram format a system support overview of the software functions of the primary microprocessor of the telephone-computer of the invention.
Figure 16:
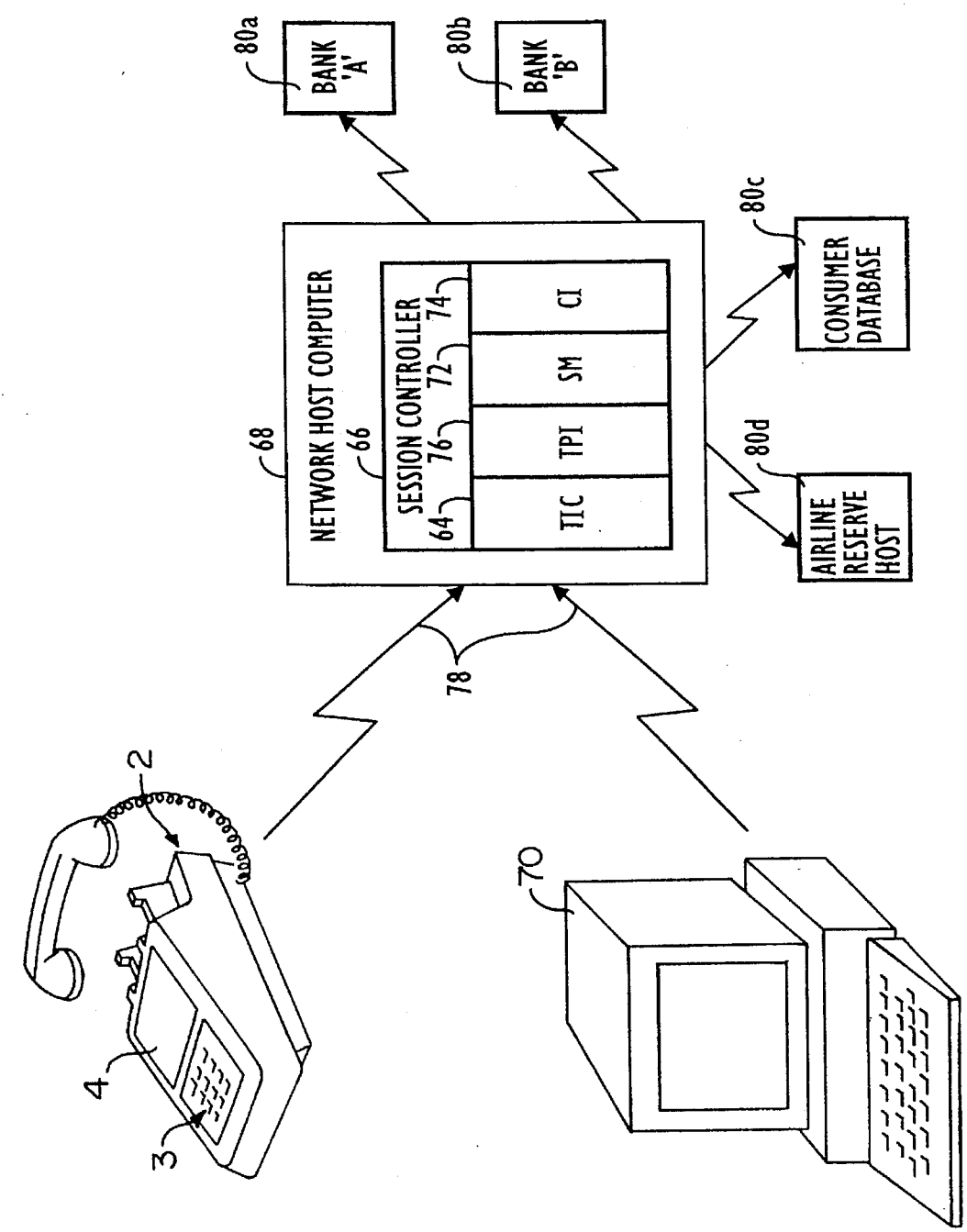
FIG. 16 is an overall view of a distributed data processing system which is accessed by the telephone-computer of the invention.

FIG. 10 shows in block diagram form the principal elements of the remotely reconfigurable computer system comprised by the telephone-computer 2 (FIG. 16). A microprocessor 30 which may comprise a Nippon Electric Corporation (NEC) Model V25 or V40 or the equivalent is connected to a programmable gate array 32 which as indicated above will typically be the model XC2018 of Xilinx Corporation of San Jose, Calif. The PGA provides the means for dynamically reconfiguring the basic architecture and control logic of the computer. The "glue" required to functionally connect the microprocessor, the memory, and the input-output chips is provided by configuring the PGA chip by supply of a series of signals, referred to by Xilinx as "configuration programs" and sometimes herein as "configuration code" or "configuration software".

A significant advantage is provided by use of this chip, in that by supply of new configuration code, changes can be made to the hardware connecting the microprocessor to the memory and the input-output chips on the circuit board. Thus, for example, if a particular hardware change needs to be made to accommodate a particular software program, this can be done readily by simply supplying reconfiguration code appropriately to the PGA chip and reconfiguring it before the software is to be run. Similarly, use of the PGA chip in many cases will allow reconfiguration of the hardware to support new peripherals—e.g., an enhanced-resolution display, an optical disk storage device, so-called "smart" or debit-card readers, or the like, which in other systems would normally require the physical addition of a new circuit board or the like.

According to a particularly preferred embodiment of the invention, the reconfiguration code is stored in a FLASH-EPROM, a read-only memory which is erasable and rewritable in response to a signal received from a remote location. This allows the PGA chip in a computer installed in a user's home to be reconfigured essentially at will, without the requirement of a service call or the like, at high speed and at low expense.

The advantage of this will be apparent to those of skill in the art: if it is desired to reconfigure the programmable gate array, for example, to cure a software bug or eliminate a virus, this can be done remotely simply by supplying new configuration code to the FLASH-EPROM 34. 256kilobytes of FLASH-EPROM will normally be sufficient.

For example, in the banking telephone-computer application, suppose that a computer virus is attacking the microprocessors 30 of the telephone-computers. Any such virus will have to conform to the microcode used to run the microprocessor. According to the invention, some of the functions of the gates internal to the programmable gate array 32 can simply be reversed, and a corresponding change made to all software downloaded to the telephone-computer to enable it to access the various service computers. The virus, not having the benefit of the change, will cease to operate and thus cease to interfere with the operation of the telephone-computer. Similarly, if communication between the service telephone-computers and the service computers tends to be corrupted or tapped, data encryption can be provided by reconfiguring some portion of the code stored in the FLASH-EPROM 34 and thus reconfiguring the gates of the programmable gate array.

From the above description, inherent in the PGA chip is the ability to initially configure it to provide the requisite interconnections between the primary microprocessor, its associated memory and the input-output chips, and then to re-configure the PGA chip in order to provide different interconnections. Alternatively, as will be appreciated by those of skill in the art from the above disclosure, such interconnections can be initially programmably configured and then fixed using such devices as PLA chips, as disclosed above, or other conventional means instead of the reconfigurable PGA chip.

The microprocessor 30 and the programmable gate array 32 are connected as well to a main memory 36 which comprises random access memory (RAM) 36 as is conventional in the art. Up to 2 megabytes of memory are typically provided. The random access memory 36 will normally be used to store application programs downloaded from a remote host, but also stores reconfiguration code when first received, prior to its being copied into the FLASH-EPROM 34.

A communication path to the network host computer 68 (FIG. 16) is provided via a serial data port indicated generally at 40. In one embodiment of the invention, port 40 is also connected to a system integrity chip 38 typically comprising a single chip Model 16C54 computer sold by the Microchip Corporation. This chip has the capability of both storing and executing code. Certain "kernel" code required to initially program the programmable gate array chip 32 is permanently stored in non-volatile, non-rewriteable ROM comprised by the system integrity chip 38 at manufacture. Thus, in response to a simple reset signal received from the outside port 40, the system integrity chip is capable of copying this kernel code to the programmable gate array chip 32. Typically the PGA chip 32 will first exercise the microprocessor 30 and verify circuit connections. Thereafter, the configuration code can be downloaded via the same port 40 or another port, stored in the random access memory 36, copied to the FLASH-EPROM 34, and used to reconfigure the programmable gate array 32.

More particularly, suppose that through error the entire system has been deprogrammed, or alternatively suppose that the telephone-computer is being manufactured and has never been programmed. In either case, the ROM 38a of the system integrity processor 38 will have stored therein the basic "kernel" or "system initialization software", required to allow configuration of the programmable gate array device. The system integrity chip, which may also be termed a "test processor", initially configures a portion of the programmable gate array device to perform a "serial scan test" which will verify the physical circuit connections of the chip. This is particularly useful because the programmable gate array chip 32 will typically be physically connected to substantially all signal paths on the circuit board, so that this test is in fact substantially complete.

The system integrity processor 38, having completed this test, then causes a first group of "system verification software" to be downloaded either from an external processor, such as the host network computer, or from a technician's test device, to reconfigure a portion of the programmable gate array to resemble read-only memory containing certain predetermined microcode. This microcode is then used by the microprocessor 30 to test its own functions, which typically will include testing of the random access and read-only memory devices. At this point, the microprocessor 30 can take over operations, and causes further reconfiguration code, the "operational reconfiguration code" (according to which the programmable gate array chip 32 is configured to perform its ultimately desired functions) to be downloaded. This is stored first in the random access memory 36, then copied to the read-only memory 34 and is then used to reconfigure the programmable gate array device 32 into its operational configuration, thus completing initial loading or test of the telephone-computer device of the invention.

In the preferred embodiment, the "operational reconfiguration code" is stored in duplicate in the FLASH-EPROM. This allows the two versions to be compared to one another, providing an additional check on system integrity.

One skilled in the art will understand that the diagram as depicted in FIG. 10 is intended to be a functional depiction, and that in fact various principal components thereof such as the microprocessor 30, the PGA 32, the FLASH-EPROM 34, the RAM 36, the system integrity processor 38 and its ROM 38a, may all be connected by a conventional data bus 48. Again, the key function of the present telephone-computer is that it can be capable of receiving and storing reconfiguration code preferably received over a telephone line or the like via a conventional port, so as to enable reconfiguration of the PGA as needed to update the hardware configuration of the system.

In the preferred embodiment of the invention as employed in the telephone-computer 2, four distinct levels of software are provided, having different access capabilities, different storage requirements, and different uses as indicated below. These four levels are the HAL software, the BIOS, the kernel, and the PGA reconfiguration code.

The highest "level" of software in the telephone-emulating version of the system, is referred to as the "home application language" or "HAL" software. The HAL software is downloaded in "pages" from a network host computer in response to the user's indication that a particular service is to be accessed. If the user indicates that he wants to determine his checking account balance, typically by pressing a single button on the telephone-computer 2 in response to a prompt, the telephone-computer 2 sends an appropriate message to the network host 68 (FIG. 16), after which the network host 68 downloads the appropriate page of HAL software necessary to prompt the user to input his user code and the like. The HAL software when received by the telephone-computer is stored in random access memory (RAM) 36 and normally is run immediately. Certain commonly used pages of HAL application software may also be stored by the telephone-computer, typically in FLASH-EPROM 34, in order to reduce the number of communications required to access the network host where this would appear useful. It is envisioned that on the order of 3–10 pages of HAL software might be typically downloaded to a telephone-computer per day. The HAL software thus provides the information necessary to provide the desired user-friendly user interface, and is downloaded in response to the user's specific request, as described in greater detail below. The HAL software is thus functionally comparable to IBM's Disk Operating System (DOS) software.

The next level of software stored in the telephone-computer is the so-called basic input-output system or "BIOS". As is conventional in IBM PC terminology, BIOS software supports various functions shared by various pages of HAL software such as display control, preparation of messages to the network host, support of keyboard functions, and the like. According to the invention, updated "multi-application" BIOS software can be downloaded from the network host when needed, a process which might take place on the order of several times per year. Updated BIOS software will initially be received in RAM and will then be copied to FLASH-EPROM for long term storage. It will be appreciated by those of skill in the art that the BIOS software provides functions which are employed by the HAL software and is thus essential in order that the HAL software can run properly.

The next lower level of software is the reconfiguration software or code which defines the state of the programmable gate array (PGA). This is also referred to as "PGA code" or "configuration code". Functions provided by the PGA chip programmed in accordance with the PGA code include functions which must be performed at high speed, such as memory control and timing, and parity checking with respect to various data communication paths, as well as providing the logic connecting the microprocessor to the RAM, ROM and input/output devices.

As in the case of the BIOS software, any update to this reconfiguration code downloaded from the network host is initially stored in the random access memory and then is copied to the FLASH-EPROM and used to reconfigure the PGA chip as need be. For example, if it appears that a software virus is active, the hardware can readily be reconfigured such that the virus could no longer run on the telephone-computer. This would of course necessitate that other software including the BIOS and possibly the HAL software be at least partially rewritten. However, these tasks can also be accomplished remotely.

The advantage of this facility is clear; for further examples, the PGA code could also be altered remotely if it were desired to add additional functions to the telephone-computer of the invention, such as adding a facsimile capability, a smart card interface, magnetic or optical memory elements, or the like. In some cases it might also be necessary to reconfigure the PGA code to cure a flaw in the hardware design detected some time later. Again, each of these options substantially increases the utility of the telephone-computer. It is not envisioned, however, that the PGA code will be altered more than once or twice over the lifetime of the product, which is anticipated to be on the order of ten years.

As indicated above, the PGA code, having reconfigured the PGA chip, thus provides the foundation on which the BIOS software operates; accordingly, the PGA chip must be configured properly for the various input-output functions controlled by BIOS to operate properly.

The final and lowest level of software is referred to as a "kernel". This software is permanently written to nonvolatile read only memory comprised by the system integrity chip 38 or possibly by a separate ROM. It is this kernel which operates the system to the extent required to allow the reconfiguration software to be downloaded to the telephone-computer in order to initially program the PGA chip as indicated above. It is not possible to alter the kernel after manufacture of the system. Again, this Software is essential in order that the PGA chip can be reconfigured by supply of reconfiguration code.

It will have been appreciated that the above described software structure provides partitioning of the various elements of software according to their functions and their frequency and ease of access. The higher level software will be more frequently accessed. Similarly, the higher levels are variable in response to a user request (in the case of the AL application) or relatively readily by the operator of the network host (in the case of the BIOS software). Access to the PGA reconfiguration software will be restricted to the manufacturers or to a relatively small group of the system operators in order to ensure that this highly significant software is not tampered with. As noted the kernel software is not alterable.

As indicated above, an extremely important object of the present invention is to allow the user to access a bank data base. Clearly in order to avoid compromising the integrity of the data base, and to restrain fraudulent transactions or the like, the system must be made highly reliable. The capability of reconfiguring the actual logic of the telephone-computer according to the invention substantially enhances this security. In this way, a hardware change can be made at any time to support a change in the software desired, for example, to alter access requirements to prevent fraudulent users or to forbid them to access the data base. Those of skill in the art will immediately recognize a number of specific changes which can be made to prevent preexisting software from running on the telephone-computer. For example, data encryption could be made essential to all terminal-to-network host communications. Regular changes, e.g. once per month, could be instituted to prevent any "hacker", from obtaining access, for example, simply by regularly changing the encryption method used.

FIG. 8 sets forth an overview of certain software functions when the primary microprocessor is programmed in the HAL format. The primary microprocessor receives certain standard software applications after compilation into the HAL pseudo-code. These applications are interpreted by a HAL interpreter located in the 256K ROM. The initial HAL application pages, certain specific routines, customer data and/or configuration data are written into the battery-backed memory so that they are protected against power failure. In the alternative, all such data except customer data may be placed in the ROM.

The primary microprocessor programs define certain microprocessor configuration parameters including the boundaries of the memory for the application pages as well as the data memory areas. The system software also provides that data pages may be written in the volatile memory. When the memory is filled and the primary microprocessor needs an additional page, the primary microprocessor transfers the new page from a network data bank and overwrites the pages which are least recently used. These overwritten pages may be retrieved from the network memory through the modem, if required again.

The system software also provide input to microprocessor diagnostics and create a power-on self test for the microprocessor. In one embodiment of the invention, the program invokes a record manager which manages a telephone list data record, activity logs, a personal configuration module and diagnostic log. Certain elements of these records are maintained in the writable battery-backed memory to provide protection against power failure.

Figure 12:
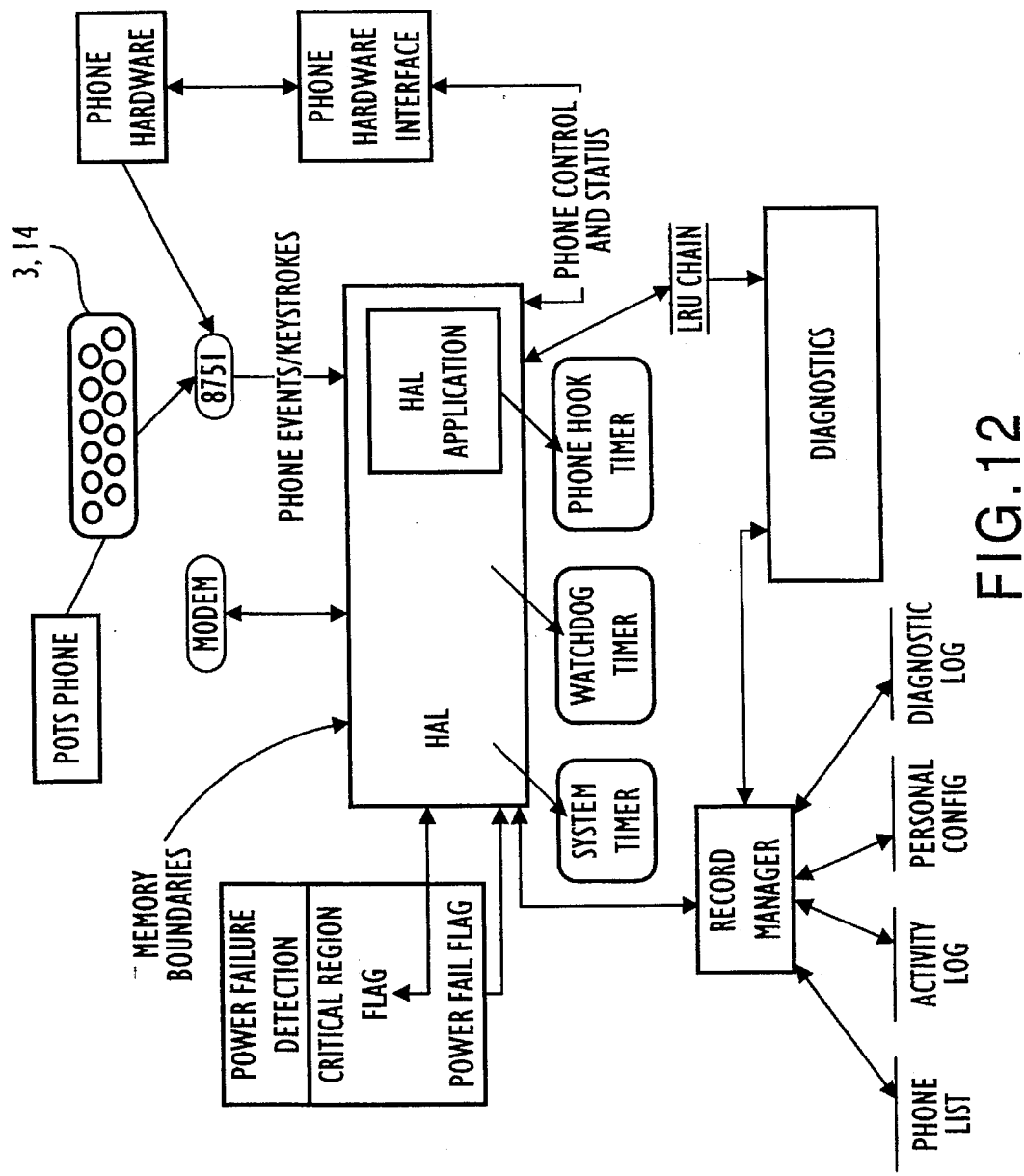
FIG. 12 depicts in block diagram format the primary microprocessor's software interface with the conventional telephone circuitry of the telephone-computer of the invention.
Figure 13:
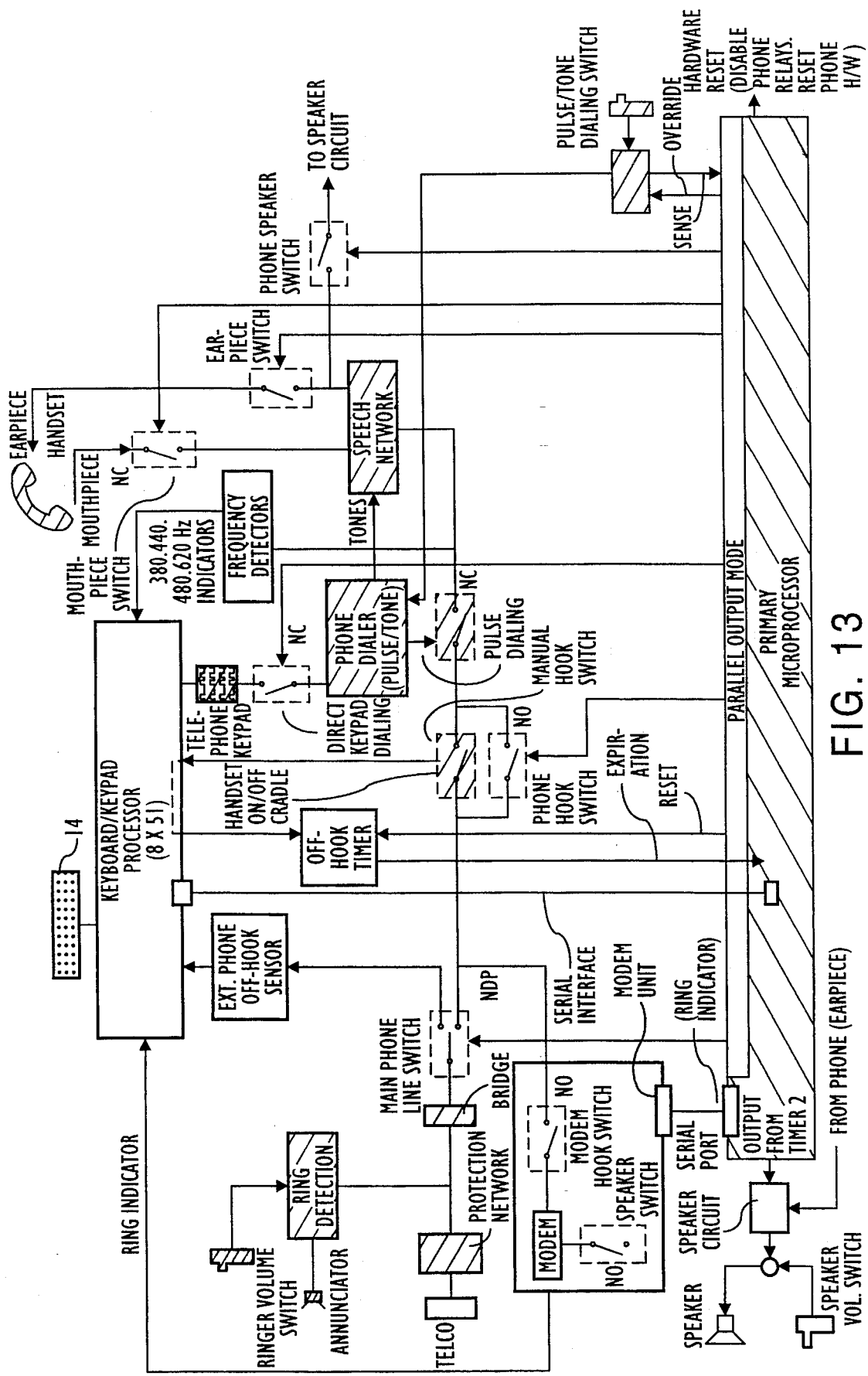
FIG. 13 is a functional block diagram of the telephone electronics and related communications features of the telephone-computer of the invention.
Figure 14:
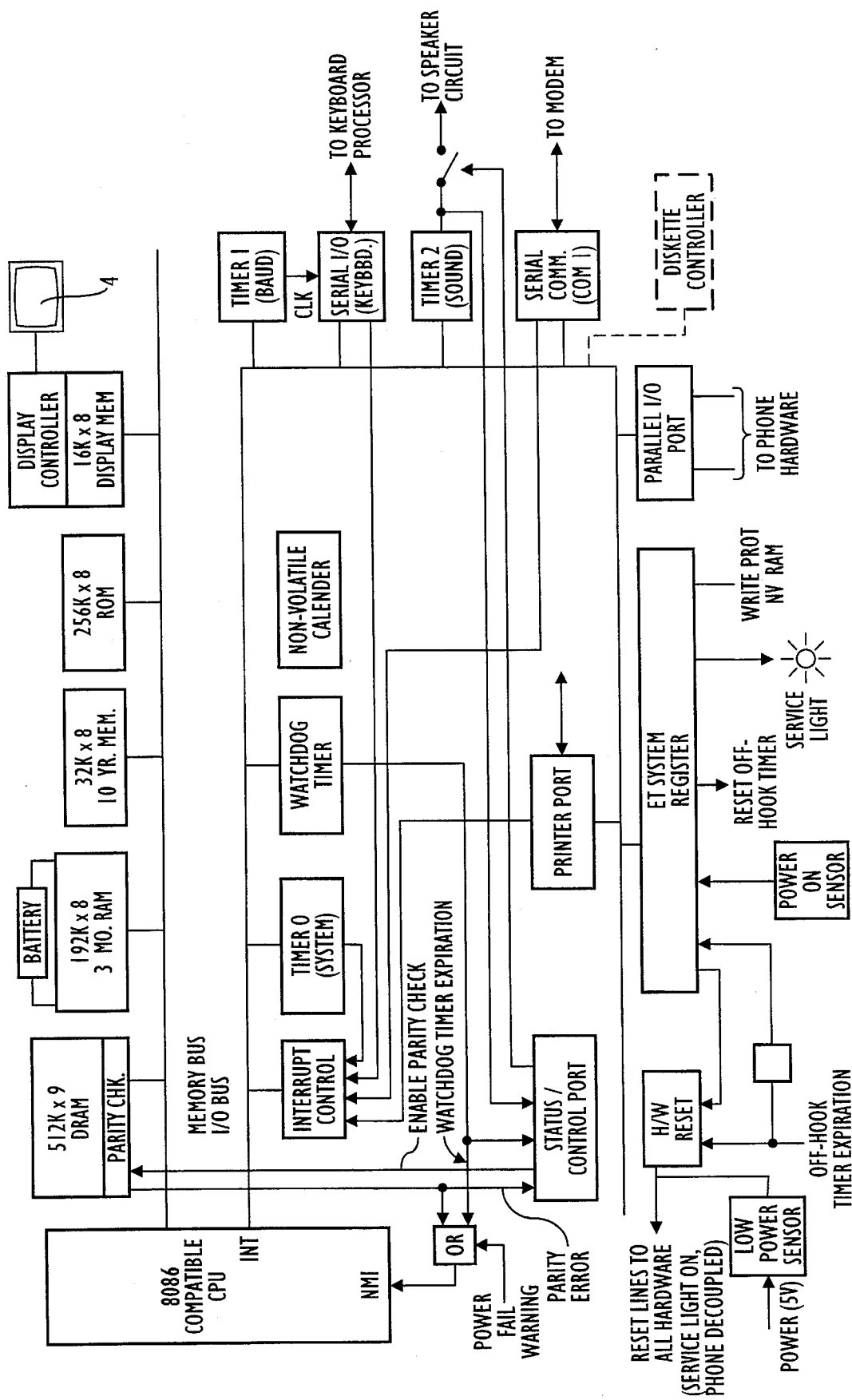
FIG. 14 is a functional block diagram of the primary microprocessor, with input/output functions of the telephone-computer of the invention.

Referring now to FIGS. 12–14, the invention's support circuitry provides a number of integrity features. These include the following error detection or failure prevention features: (1) a determination as to whether the microprocessor software is functioning properly when the telephone is taken off-hook, (2) a watchdog timer to ensure that the computer software is not malfunctioning, (3) a parity check for the microprocessor's 512K byte volatile random access memory (RAM), (4) battery power for the microprocessor's 192k byte non-volatile RAM, (5) circuitry to provide write protection for that memory, (6) power failure detection which interrupts the microprocessor when certain voltage thresholds are crossed, (7) battery low warning and (8) independent operation of the telephone electronics from the telephone line power so that when the A/C power fails, the telephone will continue to operate.

The integrity features are described in greater detail as follows:

The telephone electronics includes an off-hook timer which, when armed, senses the removal of the handset from the telephone. The function of the off-hook timer is to ensure that the primary microprocessor software is functioning properly each time the telephone is taken off-hook. The off-hook timer is set to expire at the end of a period designated off-hook timer expiration (OHTE). If the timer expires without being halted, the telephone features of the device are placed in the manual mode (i.e. the telephone continues to operate as a normal telephone) and the microprocessor is reset.

The microprocessor includes a watchdog timer which is reset through the microprocessor's Input/Output bus. If, in the period designated watchdog timer expiration (WDTE), the watchdog timer is not reset by the primary microprocessor, a nonmaskable interrupt (NMI) is generated as an input to the microprocessor. If the timer is allowed to expire a second consecutive time, a hardware reset is generated which disables the timer, decouples the telephone electronics from the primary microprocessor, reboot the primary microprocessor and activates a service light on the housing.

The microprocessor circuitry provides a parity check for the 512K byte non-battery-backed-up RAM memory. The parity error detector provides the same type of NMI and failure protection as the watchdog timer. An automatic sequencing is provided to eliminate the need for a manual reboot. If no parity error is associated with the RAM, and there is a reboot caused by a hang-up in a non-memory component, the system will execute a soft reboot without the loss of memory.

The telephone-computer electronics provides power failure protection features. The microprocessor's power failure detection circuit is responsive to certain interruptions in power to the microprocessor or low power conditions and notifies the microprocessor software after receipt of the warning detections when certain thresholds are crossed. In response to these warnings, the primary microprocessor places itself in a condition for minimum disruption if power failure OCCURS.

FIG. 13 is a block diagram of the telephone electronics of the invention. The 12-key telephone keypad includes a novel split pill output element which provides two separate output signals. One output is directed to the keyboard/keypad processor and the other to the telephone dialer. The dual output is always provided. The telephone dialer provides a pulse or tone dialing output to the telephone line. The telephone dialer function is deactivated through the direct keypad dialing switch if the processor determines that the output at the keypad should only be directed to the microprocessor and is not a part of the device's normal telephone dialing features. The direct keypad dialing switch allows the primary microprocessor to remove power from the dialer so that the keypad only provides input to the primary microprocessor.

A phone hook switch may be controlled from the primary microprocessor to connect the dialer to the telephone line without raising the handset. A main telephone switch also controlled from the primary microprocessor connects the output of the telephone dialer to the outside telephone line. The direct keypad, dialer telephone hook, and main telephone switch are all controllable from the microprocessor to permit the telephone dialer to provide pulse or tone outputs or deactivate these outputs.

One key on the 12-key keypad, usually the key, acts as a services key and may be designated a HELLO key. Activation of this services or HELLO key, when the telephone is on-hook, changes the primary microprocessor's control over the telephone from a monitoring mode to a controlling mode. The services or HELLO key feature provides computer enhanced telephone operation when the telephone is not connected to the network. The application on the primary microprocessor, in response to the services or HELLO key, typically provides a menu of microprocessor services, eliminates power to the telephone dialer (preventing unwanted dial tones from being transmitted to the network) and provides for transition of the telephone network to computer control.

In an alternative embodiment, a function key may be used in place of the HELLO key to obtain microprocessor control over the telephone.

Alternatively, one or more function keys may be mounted on the housing case of the invention adjacent to the 12-key keypad. Any function key or selected keys of the 12-key keypad can be programmed through the primary microprocessor for specific functions selected by the manufacturer. In one embodiment, function keys for speed dial and re-dial may be provided. The device may include a flash key which performs its standard function in a telephone device. The selected keys of the 12-key keypad may be programmed for these functions.

The telephone electronics includes a keyboard/keypad processor which provides an interface between the 52-key keyboard and 12-key keypad and the primary microprocessor. The alternative embodiment disclosed in FIGS. 3 and 4 uses one or more function keys. In the alternative embodiment, function key input is also provided through the keyboard/keypad processor. The interface circuitry and the primary microprocessor will support up to eight function keys. The keyboard/keypad processor also includes the invention's tone detection circuitry. The tone detection elements sense (1) busy/fast busy, (2) call-waiting, (3) ringing or (4) dial tone and provide these detections as an input to the primary microprocessor through the keyboard/keypad processor. The ring and dial tones are also provided through the speech network to the telephone handset. The primary microprocessor provides a serial input to the modem which can be connected by control from the microprocessor to the main telephone line.

The primary microprocessor and the keyboard/keypad processor have an established joint protocol requiring the primary microprocessor to have input from the keyboard/ keypad processor every five seconds. If such input is not received, both processors will be reinitialized.

The primary microprocessor is connected to a 1200 Baud or higher rate modem. The modem is also connected to the telephone line and provides an interface between the microprocessor and other elements of the computer network in which the microprocessor is used.

As mentioned above, a principal object of the invention is to provide a user-friendly telephone-computer suitable for accessing a bank computer system operating various bank software programs, involving individual checking accounts and the like, and additionally providing a user-friendly method of accessing other service computers, such as those which provide airline reservation functions, stock table look-up functions, electronic bulletin board services, and a vast panoply of other such services, and which can also operate as a conventional telephone. It will be appreciated by those of skill in the art that typically in order to access such a diverse variety of services one must have educated oneself in a equal variety of telephone-computer protocols and communication methods, which can be quite complex. For example, simply to keep track of the various user codes and access steps required to access each of these services is a substantial undertaking.

The present telephone-computer accesses a network host as described in copending application Ser. No. 08/084,319, filed Jun. 30, 1993, which is a continuation of Ser. No. 433,825, filed Nov. 9, 1989 (now abandoned), and which is incorporated herein by reference. As shown in FIG. 16, each user is provided with the telephone-computer 2 in accordance with the present invention, including the display 4 and limited format keypad 3, or an equivalent terminal with a keyboard, which communicates via conventional telephone lines indicated generally at 78, with a network host computer 68. The network host computer includes a session controller 66, which may comprise hardware and software and which includes various functional elements 64, 72, 74, and 76, as described more fully below. One essential function of the network host computer 68 is to provide a series of application program "pages" which are downloaded to the home telephone-computer 2 and which provide it with sufficient information that it can supply the user with sufficient "prompts" to elicit from the user whatever information— user codes, desired transactions, and the like—is required to access one of a plurality of service computers 80a–d to which the network host computer 68 is connected, also by conventional telephone lines.

More particularly, suppose the user desires to access the service computer 80a of a particular bank A. When he activates his home telephone-computer 2, there will appear on a display screen 4 a menu allowing him to select "Access Bank Services" by pressing, for example, the "3" button on the keypad 3. If he does so, the telephone-computer 2 will send a message to the network host computer 68. This will in turn consult its internal memory to locate the application program required to access the service computer 80a of bank A and will download this to the home telephone-computer 2. The home telephone-computer will in turn operate using this program and will ask the user various questions required to prompt the user to input the information needed to access his account at the bank —for example, his account number, his secret access code, the type of transaction desired, the amount of deposit, withdrawal, or transfer required, and so on. This information is then transferred from the home telephone-computer 2 to the network host computer 68 in a message having a first protocol. The network host computer transforms this information into whatever second protocol is conventionally required to communicate with the service computer 80a, for example, in the precise manner according to which automatic teller machines communicate with it. If on the other hand the consumer desired to access Bank B, typically the consumer will be asked the same questions by way of prompts, but the network host computer will transform the answers into a somewhat different protocol required to access the service computer 80b of Bank B.

In a similar manner, if the consumer desires to access an airline reservation host computer 80d, a somewhat different sequence of prompts would be provided by the home telephone-computer 2, operating using an appropriate different "page" of application program software downloaded by the network host computer 68; a similarly different communication sequence would occur between the network host computer 68 and the airline reservation host computer 80d. The communication sequence and in particular the detailed format of the messages back and forth between the telephone-computer 2 and the network host 68 are described in detail below.

Communication between the network host 68 and the various service computers 80a–d takes place according to various second protocols defined by the proprietors of the services supported by the service computers; implementation of these communications follows the techniques now in use with such preexisting service computers and is considered to be well within the skill of the art.

It will be appreciated by those of skill in the art that the accessing of the various service computers 80a–d and countless others requires that the network host computer be enabled to communicate according to a like variety of protocols. Typically, these will be implemented by IBM personal computer software programs; the telephone-computer 2 will therefore most conveniently also conform to the PC architecture as defined above. Further, as indicated above, it is an object of the invention that the telephone-computer 2 be capable of running other PC-compatible programs. A conventional personal computer can also be used according to the invention to communicate with the various service computers 80a–d by way of the network host computer 8. Again, "pages" of application software can be downloaded from the network host 68 to the conventional PC in response to the user's selection of a particular service computer 80a–d.

The session controller 6 provided according to the present invention serves as a link between the telephone-computer 2 and a plurality of informational and financial service computer systems 80a–d. Thus, an important function of the network host 6 and of the telephone-computer 2 and the HAL software which it runs is to cooperatively transform the highly simplified, "user-friendly" request/response sequence seen and responded to by the user into the relatively complex communication sequence normally used to access the service computers 80a–d, and, vice versa, to modify the specialized display sequence typically presented by the service computers 80a–d into an easily understood presentation.

According to an important aspect of the invention, these menu choices are varied in accordance with the service selected by the user. That is, the user-friendly interface, comprising a "tree" of new menus displayed sequentially and in response to each input provided by the user, until all information required to access the service has been specified, thus varies with the service. Provision of application programs page by page in response to the specification of a service according to the invention permits this flexibility, as it would be impractical to store all possible application programs in the telephone-computer.

The session controller 66 functionally comprises a terminal interface controller (TIC) 64, a terminal protocol interface (TPI) 76, a session manager (SM) 72, and a common integrator (CI) 74. The TIC 74 monitors the message flow between the home telephone-computer 2 and the TPI 76 and controls timers to cause timeouts when message traffic ceases. The TPI 76 communicates with the home telephone-computer 2 and translates the protocol used by the home telephone-computer when first establishing a connection with the host network computer 8. Additionally, the TPI 76 generates random encryption key numbers when requested by the home telephone-computer 2. These encryption key numbers are used by the terminal program to transmit confidential information. The TPI 76 also handles application page downloading requests.

The SM 72 maintains the essential data needed for each communication session by storing information relating to the user of the telephone-computer 2 and the service computer system 80a–d which the user is accessing. All transactions performed between the home telephone-computer 2 and the session controller 66 during a particular session occur within the context of the specific consumer and the service selected, e.g., his bank or other financial institution. For example, after the consumer has been successfully established as a valid and authorized user, all message traffic to the particular telephone-computer is thereafter considered related only to that consumer. This context determination, based on the consumer identification information, then allows the network host computer 68 to access the correct service computer 80a–d for such items as account balances, and so on. The SM 72 stores the contextual information required to validate the transaction and inserts it in messages passed to the CI 74 when necessary. The SM 72 also serves as the interface between the TPI 76 and the CI 74, which in turn serves as the communication link between the other elements of the session controller 66 and the service computer systems 80a–d.

The user accesses one particular service computer 80a–d by selecting the corresponding option, i.e. the desired service, from a menu displaying the possible choices on the LCD of his home telephone-computer. Communication between the home telephone-computer 2, the session controller 66 and the selected service computer 80a–d is then begun with a session establishment and protocol selection phase.

During the session establishment and protocol selection phase, the home telephone-computer 2 connects to the network host computer 68 through a standard telephone line 78. After the connection has been established, the home telephone-computer 2 sends a series of signals by which the session controller 66 sets such parameters as the communication baud rate. For example, after the network host computer 68 sets the communication baud rate, it responds with a terminal type inquiry. The home telephone-computer 2 interprets this signal as a request to identify the type of terminal in use and responds with an ASCII code identifying the type of home terminal being used, i.e. a telephone-computer 2 in accordance with the present invention or a PC terminal.

The network host 68 provides the important function of allowing the home telephone-computer 2 to mimic a conventional PC terminal running essentially conventional communication software. Therefore, the service computer 80a–d receives communication in precisely the same "service computer communication protocol" which it conventionally receives. Accordingly, the service computers need not be modified in any way for communication according to the invention, which is essential to achieving the objects thereof. As indicated, such conventional microcomputer systems may be also interfaced to the service computers 80a–d by way of the network host 68 according to the invention. In such case, the network host 68 will again respond to a request for access to a service computer 80a–d by downloading one or more "pages" of application software, user prompts, etc., allowing the conventional microcomputer to conveniently access the service computer 80a–d.

Figure 17:
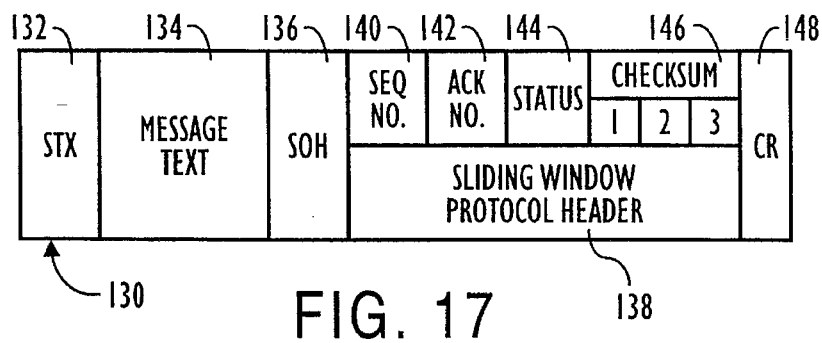
FIG. 17 shows an overall view of a distributed data processing system which is accessed by the telephone-computer of the invention.

After a communication session has thus been established, a "link level" protocol, is employed between the home computer and the session controller. In the link level protocol, all communications between the home telephone-computer 2 (or a conventional microcomputer, if used) and the network host computer 68 are formatted into information packets called messages. FIG. 17 shows the basic format of the message 130. This message format is used for the majority of the messages sent between the network host and telephone-computer 2 or computer. Other related formats are used in special cases discussed below.

Each message 130 begins with a one-byte start of text (STX) delimiter 132 which consists of the fixed AsCII code "2". The next field of the message, the message text field 134, can contain up to 256 bytes of transaction information. It is within this message text field 134 that the actual transaction information is transferred. The message text field 134 can also contain information concerning the status of the message.

Following the message text field 134 is a one-byte start of header (SOH) delimiter 136 which has a fixed ASCII value of "1". This SO H delimiter 136 signifies the end of the message text field 134 and the start of the Sliding Window Protocol Header 138.

The Sliding Window Protocol Header 138 is provided according to an important aspect of the present invention, and contains control and error management information. This header 38 comprises a sequence number field 140, an acknowledge number field 142, a status field 144, and a checksum field 146, totalling six bytes in length.

The sequence number field 140 is important to the error detection and control system employed according to the invention. This field contains a sequence number assigned by the transmitting device (i.e. either the home telephone-computer 2 or the network host) to each message sent. More specifically, the sequence number field 140 contains a one-byte ASCII encoded number from 0 to 9 specifying the order of the message 130 in a series of transmitted messages. The sequence numbers are assigned independently to the messages sent in both directions. Each successive message 130 is assigned a reference number one greater than that of the preceding message 130. The sequence numbers are applied in a cyclical fashion. That is, when sequence number 9 has been assigned to a message, the next message is assigned sequence number 0. This process is referred to as the "sliding window protocol" used for error detection and correction according to the invention.

The receiving device stores the sequence number of the message most recently received. When a new message is received, the receiving device determines if the content of the sequence number field 140 is one greater than the sequence number of the preceding message received. If not, an error has been detected, and the receiving device directs the transmitting device to resend the preceding message.

Additional security is provided by use of the checksum field 146, which contains a byte count for the entire message, which is written to the message by the network computer. This checksum value is compared with the byte count as determined by the receiving telephone-computer. If the checksum value is correct and the sequence number is in the proper order, the message is considered to have been received in good condition.

The acknowledgement number field 142 of each message contains the sequence number of the last message received in good condition. Until this acknowledgement number is received, the transmitting device stores the messages in a buffer for possible retransmission. If the transmitting device has stored one or more messages with higher sequence numbers than the last received acknowledgement number, those messages with a greater sequence number are retransmitted. Correspondingly, when an acknowledgement number is received, all stored messages having sequence numbers less than or equal to the last received acknowledgement number are discarded. This sequencing and acknowledgment method allows for the continuous flow of information without the delay associated with acknowledging each message before transmitting the next, and limits the amount of data which must be stored to implement this error correction arrangement.

It will be appreciated by those of skill in the art that sliding window protocols of this general type, including use of sequence numbers and acknowledgement of messages, are generally known to the art. See generally, Tanenbaum, *Computer Networks* (Prentice Hall, 1981), esp. §4.2 "Sliding window Protocols", pp. 148–164.

There is, however, one limitation on this continuous flow of messages. Because the range of reference numbers is finite, the maximum number of messages which can be sent without repeating a reference number is 10. Accordingly, if all the sequence numbers available in the finite range 0–9 have been assigned to unacknowledged messages, the transmitting device ceases message transmissions and sends an immediate acknowledgement request in a null message, that is, a message which contains no information in its message text field, but which has a sequence number equal to that of the preceding message. The receiving device recognizes a null message by its repetition of the preceding sequence number. A null message is thus used to convey control information such as an immediate acknowledgement request.

The status field 144 is a one byte (eight bit) field which informs the receiving device of the status of the message and provides a medium for various control requests. FIG. 3 details the bits of the status field 144. Bits 7 and 5 are always set to zero and one, respectively, so that the value of the complete status byte 144 is in the range of 32 to 127. Hence, the value of the status field can be represented by the ASCII codes for print characters, which is convenient for diagnostic purposes. Bit 6 indicates the transmission channel over which the message is travelling. A value of 0 in bit 6 represents a foreground, or high priority, transmission channel, and a value of 1 in bit 6 indicates use of a background, or low priority, transmission channel.

Bit 4 is used to inform the receiving computer whether the response is contained in more than one message and whether there is at least one more message to come which is related to the response contained in the present message. A value of 0 in bit 4 indicates that the present message is the last or only segment in a response while a value of 1 in bit 4 informs the receiving computer that the present message is the first or an intermediate segment of a multi-segment response.

Bit 3 distinguishes normal session messages from connect messages used when communications are first established between the home computer and the network computer. A bit 3 value of 0 represents a normal data message, while a bit 3 value of 1 signifies a connect request or response. Similarly, bit 2 indicates whether a message is a normal session message or a disconnect request, in which 0 indicates a normal session message and 1 requests a disconnect.

Bit 1 is set to a value of 1 to request retransmission of all unacknowledged messages, i.e., messages with a higher reference number than the acknowledgement number of the message containing the retransmission request. A 0 value in bit 1 indicates a normal message.

Bit 0 is set to a value of 1 to request acknowledgement from the receiving computer. This signal would be sent, for example, in the situation explained above, in which the sending computer has used all of the reference numbers and requires an acknowledgement before sending any more messages. A 0 value in bit 0 indicates a normal message.

The checksum field 146 as indicated above contains a bit count or similar value calculated by the sending device; the same calculation is performed by the receiving device and compared to the stored value to confirm that the message has been correctly received. Finally, the message 130 concludes with a carriage return (CR) 148.

According to the invention, when one of the devices involved in a communication session sends a message 130 containing either an acknowledgement request, an acknowledgement response, a retransmit request, a connect request or a disconnect request, there may be no transaction data to be transmitted in the message text field. Hence, this information is sent through a null message, including a repeated reference number as above. This informs the receiving computer that any transaction data that may be contained in the text field is to be ignored and that the header information only is to be read. Of course, it is not necessary to send a null message for the above mentioned requests and responses. Instead, a normal message may be used which sends the request or response information, while transaction information is sent in the text field. Null messages are sent when a normal message is not available and an acknowledgement has been requested, or when the maximum number of messages is outstanding, and no more normal messages may be sent.

Figure 19:
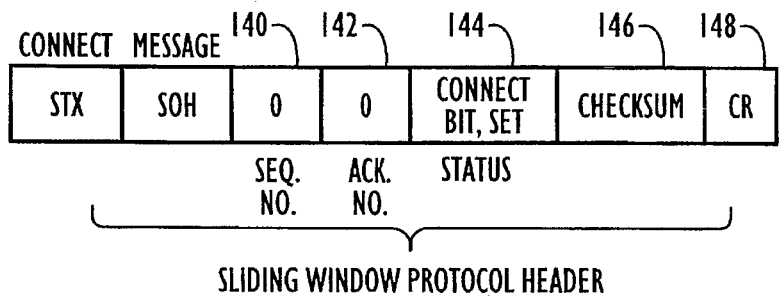
FIG. 19 is a diagrammatic view of a connect message employed according to the processing system of FIG. 17.

In establishing a communication session, the home telephone-computer sends a connect request message, shown in FIG. 19. When the session controller returns a connect response, shown in FIG. 20, the session is established and all subsequent communications proceed using the message format discussed above. At the beginning of each session, a series of messages (shown in FIGS. 23 and 24) are exchanged to determine if the application pages resident in the home telephone-computer are current versions. Where necessary, outdated application pages in the home telephone-computer are replaced by current versions which are downloaded to the home telephone-computer, page by page, as need be, using the predefined message format. Updates are made only with respect to the application page(s) specific to the service of current interest to the user. This reduces the delay experienced by the user, while eliminating any requirement that all users have the same version of each application page.

Because some transactions available through the network involve individual financial accounts, an exchange of user verification messages is employed in these cases to ensure against unauthorized manipulation of consumer accounts. Accordingly this aspect of the invention, when the user has indicated his intention to perform a financial transaction or other transaction requiring access to a secure database, the terminal program interface (TPI) 16 instructs the telephone-computer computer via a downloaded page to send a request for an encryption key. The TPI returns a randomly generated key. The telephone-computer 2 uses this to encrypt the consumer's personal identification code (PIC), that is, a code indicating his right to access the secure database. The encrypted PIC is then transmitted to the network host 68 in a user verification message. Similarly, any other secure information may be encrypted at any time during a session if the terminal program includes instructions for sending additional encryption messages. Each time a key is requested, a new encryption key is generated.

After the user verification stage is complete (which may also include a step of identifying the user to the telephone-computer by input of his serial number, or identification of the telephone-computer to the network host, either or both of which must be validated before the transaction can proceed) the consumer may perform various transactions with the informational and financial service computer systems. Such transactions can take a variety of forms, as will be understood by those of skill in the art.

Once the page updating procedure has been completed as necessary and the home telephone-computer is loaded with the application pages necessary to access the service the consumer desires, the consumer can effect transactions with service providers. Operations then proceed in a simple and straightforward manner. The consumer is prompted by software downloaded to the home telephone-computer as need be to provide any additional input required, and the appropriate message is sent by the home telephone-computer to the service computer which actively accesses the database bank records, etc., involved. Again, according to the invention, the home telephone-computer 2 provides a user-friendly interface, and the network host computer 68 translates the user's responses to prompts, sent by the telephone-computer 2 to the host in a first format, into the format conventionally employed to access the particular service computer 80*a–d* providing the service desired.

In general, it is desirable that the prompts be sufficiently definite that the user can input all required instructions using only the 12 keys of a telephone keypad responsive to prompts which are updated in response to the sequence of prior responses. This greatly simplifies use of the system, and contributes substantially to the user friendliness which is a goal of the invention. However, in some cases it may be necessary to provide all 26 alphabetic keys as well, e.g. to spell out airline destinations. In such cases, a small keyboard 14 sliding out of the housing of the telephone-computer is used.

If the consumer wishes to use a service for which the home telephone-computer has not stored the application pages, an explicit request message can be sent for the necessary pages. This capability clearly provides unprecedented flexibility in provision of network access to users operating simple, low-cost, user-friendly terminal devices according to the invention.

Figure 18:
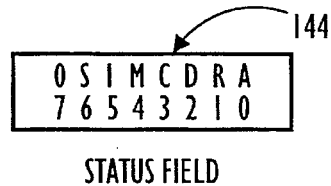
FIG. 18 is a diagrammatic view of the message format employed according to the processing system of FIG. 17.

When a communication session between the home telephone-computer 2 and the network host computer 68 has been established and both devices are prepared to communicate in the link level protocol message format of FIG. 17, the home telephone-computer 2 sends a connect request message shown in FIG. 19. The connect request message contains no information in the message text field, but the connect bit, bit 3 of the status field 144 of the sliding window protocol header (see FIG. 18), is set to 1. The sequence and acknowledgment fields 140 and 142 are shown in FIG. 19 is set to zero, but the sequence number may begin as a number from 0 to 9.

Figure 20:
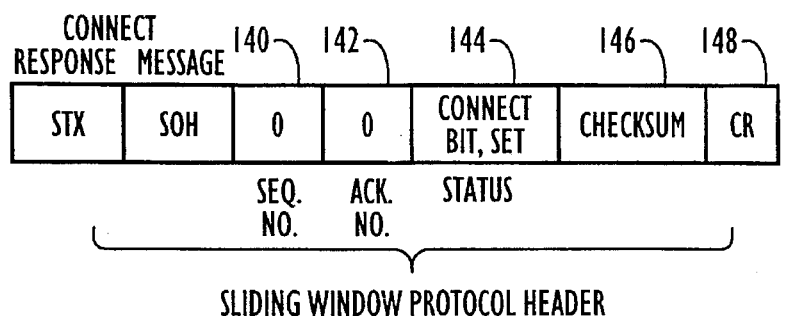
FIG. 20 is a diagrammatic view of a connect response message employed according to the processing system of FIG. 17.

When the network host computer 68 receives the connect request message of FIG. 19 from the home telephone-computer 2, it sends a connect message response shown in FIG. 20. As with the connect request message, the connect bit in the status field 144 is set to 1. Although the sequence and acknowledgement fields 140 and 142 are again shown here as "0", the network computer echoes back, in the acknowledgment field 142 of the connect response message, the sequence number sent by the home telephone-computer in the connect request message. As noted, the network terminal 68 may start the sequence with any number from 0 to 9. In its next message, the home telephone-computer 2 will similarly include an acknowledgement number equal to the sequence number of the connect response message. The other fields of the connect and connect response messages are as described above.

As discussed above, to ensure the availability of the most current software on the home telephone-computer, individual HAL pages resident in the home telephone-computer are updated as necessary. Superseded and outdated pages are purged, and revised versions replace earlier versions. As storage is limited in the home telephone-computer 2, only the pages that are frequently used by the individual consumer are resident in the home telephone-computer. Infrequently used pages can be provided by the network host computer 68 when needed by the home telephone-computer 2 to access infrequently used network service providers. The updating process occurs at the beginning of each session, but page downloads can be requested at any time throughout the session, after the log-on process has been completed. The same communication process can be used to update pages normally stored in the home telephone-computer when necessary.

Current versions of all HAL pages are stored by the network host computer 8. When new versions are developed, the new pages are transferred to the data bank of the network host computer 8. The updated pages are transferred to the home telephone-computer 2 page-by-page during normal communication sessions.

Figure 21:
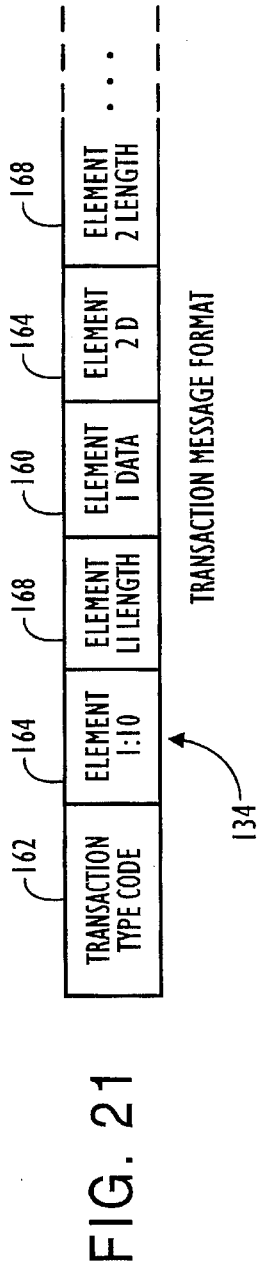
FIG. 21 is a diagrammatic view of a transaction message format employed according to the processing system of FIG. 17.
Figure 22:
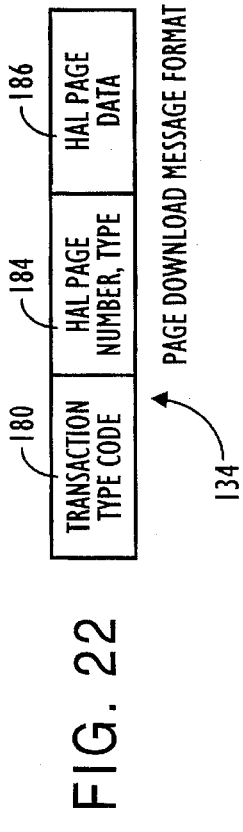
FIG. 22 is a diagrammatic view of a page downloading message text format employed according to the processing system of FIG. 17.

The format of the message text field of messages exchanged during the page downloading process is different than when used for transaction messages. FIGS. 21 and 22 illustrate, the different formats used within the message text field 134 with respect to conventional transaction messages and page downloading messages, respectively. As shown in FIG. 21, the transaction message includes a transaction type code field 162. All transaction type codes are three characters in length. The subsequent message elements 162, 164, 168, 160 are identified by their positions in the text field rather than by element ID fields.

More particularly, as shown in FIG. 21, the message text field 134 includes at least four sub-fields when used for sending transaction message text. The first field of the message text field 134 is a transaction type code 162, which is normally numeric. This is followed by one or more groups of three fields. Each group of three fields includes an element identification field 164, an element length field 168 and the actual element data field 160. For example, when the service computer 80*a–d* selected requires a user identification number, and a request to this effect has been sent to the home telephone-computer 2 by the network host computer 8, the home telephone-computer generates a message including a code in the element ID field 164 indicating that the subsequent element data field 160 includes the user identification number. The element length field 168 then simply includes the actual length in bits of the data element 160. Additional data, such as the user account number, can be included in the same message; again, the account number would be located in an element data field 160, and would be preceded by an element ID indicating that the subsequent data field includes the account number, and an element length field 168.

This method of communicating data elements, by providing them in groups of three fields, specifying the element identification and the element length, is important to the efficient realization of the communications scheme according to the invention.

FIG. 22 shows the format of a page downloaded message. This format is used for downloading pages of HAL software from a network host computer 68 to the individual telephone-computers 2. For example, suppose the home telephone-computer 2 is used to initiate a communication session in response to a user's pressing a key identifying the initial request for access to a service computer 80a–d. The initial request for access to a service will be interpreted by the network host 68 to specify the HAL application page to be used to access the service computer. If necessary, the network host will download the latest version of that page using the downloading message text format shown in FIG. 22. This text is stored in the message text frame 134 of the overall message shown in FIG. 17.

The downloading message text format commences with a transaction type code field 80 in which is provided an alphabetic transaction code indicating, for example, that the subsequent data is a page of a HAL application program. This is followed by a page number field 84 which includes the page number of the following page of software, or other identification data needed. Finally, the actual application software page needed by the home telephone-computer is provided in a page data field 86.

Figure 23:
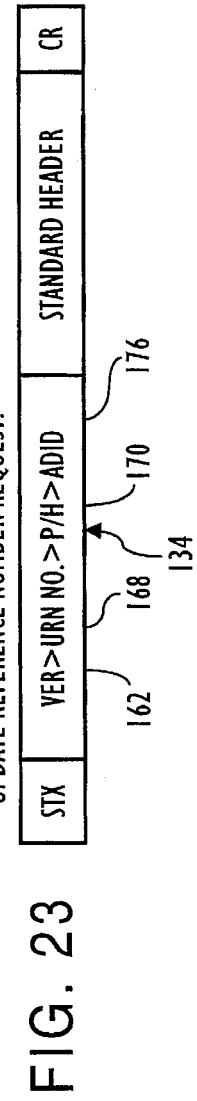
FIG. 23 is a diagrammatic view of a page update request message employed according to the processing system of FIG. 17.
Figure 24:
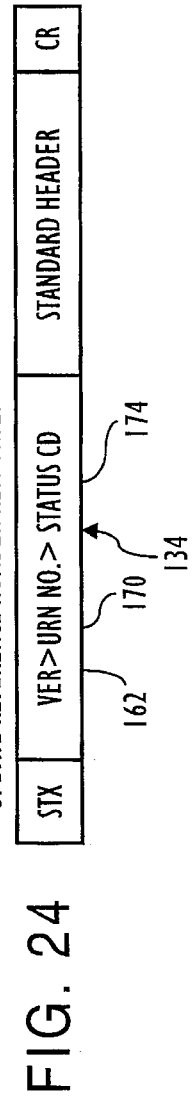
FIG. 24 is a diagrammatic view of a response to the page update request message of FIG. 23.

The following description of FIGS. 23 and 24 provides a more detailed view of the way in which the home telephone-computer and network host determine that an update of a particular software page or pages is necessary. As noted, to ensure that the home telephone-computer does not utilize outdated application pages, each session begins with a page update exchange. These are exemplary of transaction text messages, and will provide to those of skill in the art sufficient information to implement the other communications necessary to effect the functions of the invention. Other necessary messages generally follow the same format; their detailed functions and implementation are considered to be within the skill of the art.

The home telephone-computer sends an update reference number (URN) request message following the receipt of the connect response message. Referring to FIG. 23, the URN request message is a normal message containing the URN coded request in the message text field. The URN request begins with a transaction code 162, shown here as VER. Thus, the data field 134 in this request message comprises the page numbers 168 of the application pages stored in the home telephone-computer 2 at the beginning of the present session.

The URN messages also specifies in a field 170 marked P/H which type of home telephone-computer is being used. This information is important in determining the priority used in sending update information. The final data field 176 includes the terminal ID (ADID).

The network computer responds to the URN request message of FIG. 23 with a URN response message shown in FIG. 24. The transaction code 162 (VER) is repeated. This repetition of transaction codes is used in all transaction messages in order for the receiving device to determine the request message to which a given response applies.

The next data field 170 in the URN response is the URN for the current application page stored in the network computer. The final data field is a 2 digit status code 174 which informs the host terminal whether page updating is necessary.

If the home terminal URN is lower than the network computer URN, page updating is necessary. The network host computer 68 accumulates the list of pages that have new versions from a cross reference file, employing the home terminal URN and the network terminal URN.

An immediate send flag is provided which is set to "1" for pages related to particularly significant functions such as log-on or the main menu displayed to the user. These pages are downloaded prior to sending the Urn response message, that is, immediately upon establishment of the session. If any of the pages have an Immediate Send flag set to "1", they are put at the top of the download file. The pages with the flag set to "0" are put in a zero length transactional file.

If during the session, following the page update process, the consumer wishes to use a service for which the home telephone-computer does not have the necessary pages, an explicit page request can be sent.

It will be appreciated by those of skill in the art that there have been described several important and unique aspects of the system of the invention. Of particular importance in allowing a user friendly home telephone-computer system to be employed with a variety of service computers is the concept of providing a network host computer which receives relatively simple requests from the telephone-computer, and responds to these with requests for any additional data required, together with screen commands and the like, such that the home telephone-computer can readily prompt the user to provide whatever additional data is needed. In this way the "intelligence" of the network host is effectively combined with that of the telephone-computer to generate all information required to access the various service computers. This limits the amount of communication between the user and the service computer to a minimum, which is important in reducing the cost of the service to the consumer.

The use of the network host 68 to update the software comprised by the home telephone-computer page by page also has great significance, in that in this way the home telephone-computer can be provided with many additional capabilities, while remaining a relatively inexpensive and compact unit and retaining the "user-friendly" appearance which is highly desirable. Furthermore, this capability allows access to further services to be provided in the future without requiring any physical modification of the telephone-computer. The "sliding window" error detection and correction scheme is also highly useful in realizing the objects of the invention.

The use of the standardized message format discussed above, in which varying numbers of individual data elements can be communicated back and forth between the home telephone-computer and the network host, simply by specifying the identification of the element, is also of great utility, inasmuch as this greatly simplifies communication between the telephone-computer and the network host and renders this communication relatively flexible. At the same time, use of the same overall message format for all messages, including both data items such as user identification numbers and software such as downloaded pages, further simplifies the communication scheme provided according to the invention.

Finally, it will be recognized by those of skill in the art that while a preferred embodiment of the invention has been described in detail, this is not to be considered a limitation on the invention, but merely as exemplary thereof. Other modifications and improvements will be envisioned by those of skill in the art. Accordingly, the present invention is not be limited by the above disclosure, but only by the following claims.

We claim:

1. A user-friendly personal communication device having means for operating as a personal computer and a simplified user interface, said personal communication device comprising:

a telephone dialer;

electronics for said telephone dialer;

a standard telephone keypad, said keypad providing output to said telephone dialer;

a microprocessor having an associated memory and a plurality of components, said microprocessor means being responsive to inputs from said standard telephone keypad and instructions maintained in said memory to perform computing and control functions; and fixed logic means for defining interconnections among said components of said microprocessor and said associated memory.

2. A user-friendly personal communication device as claimed in claim 1, wherein said telephone electronics provide standard telephone functioning when power is disconnected from said microprocessor.

3. A user-friendly personal communication device as claimed in claim 1, further comprising a display device, and wherein said microprocessor includes means for driving said display device.

4. A user-friendly personal communication device as claimed in claim 2, further comprising a modem, and wherein said microprocessor and said associated memory are connected to a telephone line through said modem.

5. A user-friendly personal communication device as claimed in claim 1, further comprising a second keyboard.

6. A user-friendly personal communication device as claimed in claim 1, further comprising a second hidden keyboard.

7. A user-friendly personal communication device having means for operating as a personal computer with a simplified user interface, said personal communication device comprising:

a telephone dialer;

electronics for said telephone dialer for the operation of telephone service;

a standard telephone keypad, said keypad providing output to said telephone dialer;

a microprocessor having an associated memory and a plurality of components, said microprocessor being responsive to inputs from said standard telephone keypad and instructions maintained in said memory to perform computing and control functions, said microprocessor also being responsive to inputs provided from said telephone electronics and providing control of said telephone electronics, and said associated memory incorporating both volatile and non-volatile elements so that said microprocessor and said associated memory may be programmed as a computer; and fixed logic means for defining interconnections among said components of said microprocessor and said associated memory.

8. A user-friendly personal communication device as claimed in claim 7, further comprising lapse timer means reset by output from said microprocessor for providing an interrupt to said microprocessor unless reset by said microprocessor within a first predetermined time, said microprocessor being rebooted and said lapse timer means being disabled unless said lapse timer means is reset within a second predetermined time interval.

9. A user-friendly personal communication device as claimed in claim 7, further comprising:

a standard telephone handset;

detector means for detecting an off-hook condition on said handset; and timer means responsive to said off-hook detector means and said microprocessor to reboot said microprocessor if said timer means is not reset by said microprocessor within a predetermined time interval.

10. A user-friendly personal communication device as claimed in claim 7, further comprising:

parity check means for providing error detection for at least a part of said memory; and logic means responsive to said parity check means for providing an interrupt to said microprocessor when said parity check means provides an error detection.

11. A user-friendly personal communication device as claimed in claim 7, further comprising a dual output device, wherein said keypad provides simultaneous outputs to said telephone dialer and said microprocessor through said dual output device.

12. A user-friendly personal communication device as claimed in claim 7, further comprising a second keyboard.

13. A user-friendly personal communication device as claimed in claim 7, further comprising a second hidden keyboard.

14. A user-friendly personal communication device having means for operating as a personal computer and a simplified user interface, said personal communication device comprising:

a standard telephone keypad;

telephone electronics, including a dialer, for performing standard telephone functions; and a microcomputer including a microprocessor having an associated memory, a plurality of components, and fixed logic means for defining interconnections among said components, said microprocessor being responsive to inputs from said telephone keypad and instructions retained in said associated memory to perform general computer functions;

said associated memory comprising both volatile and non-volatile memory elements, thus enabling said personal communication device to operate as a general purpose computer; and said microprocessor being also responsive to inputs provided from said telephone electronics and providing control of said telephone electronics.

15. A user-friendly personal communication device as claimed in claim 14, wherein said telephone electronics provide standard telephone functioning when power is disconnected from said microprocessor.

16. A user-friendly personal communication device as claimed in claim 14, further comprising a display device, and wherein said microprocessor includes means for driving said display device.

17. A user-friendly personal communication device as claimed in claim 16, wherein said microcomputer further comprises modem means for communicating with a remote computer.

18. A user-friendly personal communication device as claimed in claim 17, wherein said microcomputer accesses a network host computer via said modem means, said network host computer communicating with information and financial services in formats used by said services and transmitting programs conforming to a format which said microprocessor understands, thereby enabling said microcomputer to communicate with said information and financial services which use formats that are incompatible with said microprocessor.

19. A user-friendly personal communication device as claimed in claim 18, further comprising watchdog timer means resettable by output from said microprocessor for providing an interrupt to said microprocessor unless reset by said microprocessor within a first predetermined time limit, said microprocessor being rebooted and said watchdog timer means being disabled unless said watchdog timer means is reset within a second predetermined time limit.

20. A user-friendly personal communication device as claimed in claim 19, further comprising:
  a standard telephone handset;
  detector means for detecting an off-hook condition on said handset; and
  timer means responsive to said off-hook detector means and signals from said microprocessor for rebooting said microprocessor if said timer means is not reset by said microprocessor within a predetermined time interval after detecting such off-hook condition.

21. A user-friendly personal communication device as claimed in claim 20, further comprising:
  parity check means for providing error detection for at least a part of said memory; and
  logic means responsive to said parity check means for providing an interrupt to said microprocessor when said parity check means provides an error detection.

22. A user-friendly personal communication device as claimed in claim 14, further comprising a dual output device, wherein said keypad provides simultaneous outputs to said telephone dialer and said microprocessor through said dual output device.

23. A user-friendly personal communication device as claimed in claim 14, further comprising a keyboard for inputting instructions and data to said microprocessor.

24. A user-friendly personal communication device as claimed in claim 23, wherein said keyboard being movable between a position retracted from said housing for use, and a position hidden within said housing when not used.

25. A user-friendly personal communication device as claimed in claim 14, wherein said keypad further includes additional programmable function keys.

26. The user-friendly personal communication device as claimed in claim 14, further comprising an accessories port for connecting peripheral accessories to said personal communication device.

27. The user-friendly personal communication device as claimed in claim 14, wherein said fixed logic means controls logical connections between said microprocessor and said associated memory.

28. The user-friendly personal communication device as claimed in claim 14, wherein said memory includes electrically programmable non-volatile memory devices.

29. The user-friendly personal communication device as claimed in claim 17, wherein said modem has means for detecting and distinguishing busy, call-waiting, ringing, dial, and redial tones.

30. The user-friendly personal communication device as claimed in claim 14, wherein said microprocessor is programmable at several different system levels.

31. The user-friendly personal communication device as claimed in claim 30, wherein said different system levels includes a software which is downloaded in pages from a network host terminal, a BIOS software which can be downloaded by an external computer, including such network host computer, and kernel software which is permanently resident in said memory.

32. The user-friendly personal communication device as claimed in claim 17, wherein said microcomputer further comprises a processor which is logically connected to said microprocessor and said keypad for providing an interface between said microprocessor and said keypad.

33. The user-friendly personal communication device as claimed in claim 32, wherein said microprocessor further includes a system integrity processor with a ROM memory device which stores initial instructions for the microprocessor.

34. A user-friendly personal communication device having means for operating as a personal computer, comprising:
  standard telephone electronics and computer components, said standard telephone electronics including a telephone dialer and performing standard telephone functions, and said computer components comprising a microcomputer including a microprocessor having associated memory means for storing instructions for said microprocessor means and fixed logic means for defining interconnections among said computer components and said associated memory means;
  a housing for retaining therein said telephone electronics and said computer components;
  a display driven by said microprocessor;
  a modem for communicating with remote computers via telephone lines; and
  a telephone keypad for selectively providing inputs to said telephone dialer and to said microprocessor, whereby said microprocessor is responsive to inputs from said keypad and instructions in said memory means to function as a computer.

35. A user-friendly personal communication device as claimed in claim 34 wherein said telephone electronics provide standard telephone operations when power is disconnected from said microprocessor.

36. A user-friendly personal communication device as claimed in claim 34, wherein said microcomputer accesses a network host computer via said modem means, said network host computer communicating with information and financial services in formats used by said services and transmitting programs conforming to a format which said microprocessor understands, thereby enabling said microcomputer to communicate with said information and financial services which use formats that are incompatible with said microprocessor.

37. A user-friendly personal communication device as claimed in claim 36, further comprising watchdog timer means resettable by output from said microprocessor for providing an interrupt to said microprocessor unless reset by said microprocessor within a first predetermined time limit, said microprocessor being rebooted and said watchdog timer means being disabled unless said watchdog timer means is reset within a second predetermined time limit.

38. A user-friendly personal communication device as claimed in claim 37, further comprising:
  a standard telephone handset;

detector means for detecting an off-hook condition on said handset; and timer means responsive to said off-hook detector means and signals from said microprocessor for rebooting said microprocessor if said timer means is not reset by said microprocessor within a predetermined time interval after detecting such off-hook condition.

39. A user-friendly personal communication device as claimed in claim 38, further comprising:

parity check means for providing error detection for at least a part of said memory; and logic means responsive to said parity check means for providing an interrupt to said microprocessor when said parity check means provides an error detection.

40. A user-friendly personal communication device as claimed in claim 39, further comprising a dual output device, wherein said keypad provides simultaneous outputs to said telephone dialer and said microprocessor through said dual output device.

41. A user-friendly personal communication device as claimed in claim 34, further comprising a keyboard for inputting instructions and data to said microprocessor.

42. A user-friendly personal communication device as claimed in claim 41, wherein said keyboard being movable between a position retracted from said housing for use, and a position hidden within said housing when not used.

43. A user-friendly personal communication device as claimed in claim 34, wherein said keypad further includes additional programmable function keys.

44. The user-friendly personal communication device as claimed in claim 34, further comprising an accessories port for connecting peripheral accessories to said personal communication device.

45. The user-friendly personal communication device as claimed in claim 34, wherein said fixed logic means controls logical connections between said microprocessor and said associated memory.

46. The user-friendly personal communication device as claimed in claim 34, wherein said memory includes electrically programmable non-volatile memory devices.

47. The user-friendly personal communication device as claimed in claim 44, wherein said modem has means for detecting and distinguishing busy, call-waiting, ringing, dial, and redial tones.

48. The user-friendly personal communication device as claimed in claim 34, wherein said microprocessor is programmable at several different system levels.

49. The user-friendly personal communication device as claimed in claim 48, wherein said different system levels includes a software which is downloaded in pages from a network host terminal, a BIOS software which can be downloaded by an external computer, including such network host computer, and kernel software which is permanently resident in said memory.

50. The user-friendly personal communication device as claimed in claim 34, wherein said microcomputer further comprises a processor which is logically connected to said microprocessor and said keypad for providing an interface between said microprocessor and said keypad.

51. The user-friendly personal communication device as claimed in claim 50, wherein said microprocessor further includes a system integrity processor with a ROM memory device which stores initial instructions for the microprocessor.

52. A user-friendly personal communication device having means for operating as a personal computer, comprising:

a housing configured as a conventional telephone;

a display mounted at the front of said housing;

a standard telephone keypad, telephone electronics, and a microcomputer retained in said housing, said telephone electronics including a telephone dialer and being responsive to said keypad for performing standard telephone functions, said microcomputer including a microprocessor with associated memory and fixed logic means for controlling logical connections between said microprocessor and said associated memory, said microprocessor driving said display and also being responsive to inputs from said keypad and to instructions retained in said associated memory for operating said microcomputer.

53. A user-friendly personal communication device as claimed in claim 52 wherein said telephone electronics provide standard telephone operations when power is disconnected from said microprocessor.

54. The telephone computer of claim 52, wherein said microcomputer further comprises modem means for communicating with a remote computer.

55. A user-friendly personal communication device as claimed in claim 54, wherein said microcomputer accesses a network host computer via said modem means, said network host computer communicating with information and financial services in formats used by said services and transmitting programs conforming to a format which said microprocessor understands, thereby enabling said microcomputer to communicate with said information and financial services which use formats that are incompatible with said microprocessor.

56. A user-friendly personal communication device as claimed in claim 55, further comprising watchdog timer means resettable by output from said microprocessor for providing an interrupt to said microprocessor unless reset by said microprocessor within a first predetermined time limit, said microprocessor being rebooted and said watchdog timer means being disabled unless said watchdog timer means is reset within a second predetermined time limit.

57. A user-friendly personal communication device as claimed in claim 56, further comprising:

a standard telephone handset;

detector means for detecting an off-hook condition on said handset; and timer means responsive to said off-hook detector means and signals from said microprocessor for rebooting said microprocessor if said timer means is not reset by said microprocessor within a predetermined time interval after detecting such off-hook condition.

58. A user-friendly personal communication device as claimed in claim 57, further comprising:

parity check means for providing error detection for at least a part of said memory; and logic means responsive to said parity check means for providing an interrupt to said microprocessor when said parity check means provides an error detection.

59. A user-friendly personal communication device as claimed in claim 52, further comprising a dual output device, wherein said keypad provides simultaneous outputs to said telephone dialer and said microprocessor through said dual output device.

60. A user-friendly personal communication device as claimed in claim 52, further comprising a keyboard for inputting instructions and data to said microprocessor.

61. A user-friendly personal communication device as claimed in claim 60, wherein said keyboard being movable between a position retracted from said housing for use, and a position hidden within said housing when not used.

62. A user-friendly personal communication device as claimed in claim 52, wherein said keypad further includes additional programmable function keys.

63. The user-friendly personal communication device as claimed in claim 52, further comprising an accessories port for connecting peripheral accessories to said personal communication device.

64. The user-friendly personal communication device as claimed in claim 52, wherein said memory includes electrically programmable non-volatile memory devices.

65. The user-friendly personal communication device as claimed in claim 54, wherein said modem has means for detecting and distinguishing busy, call-waiting, ringing, dial, and redial tones.

66. The user-friendly personal communication device as claimed in claim 52, wherein said microprocessor is programmable at several different system levels.

67. The user-friendly personal communication device as claimed in claim 66, wherein said different system levels includes a software which is downloaded in pages from a network host terminal, a BIOS software which can be downloaded by an external computer, including such network host computer, and kernel software which is permanently resident in said memory.

68. The user-friendly personal communication device as claimed in claim 54, wherein said microcomputer further comprises a processor which is logically connected to said microprocessor and said keypad for providing an interface between said microprocessor and said keypad.

69. The user-friendly personal communication device as claimed in claim 68, wherein said microprocessor further includes a system integrity processor with a ROM memory device which stores initial instructions for the microprocessor.

70. A user-friendly personal communication device having means for operating as a personal computer, comprising:

a housing configured as a telephone;

telephone electronics including a telephone dialer, said telephone electronics being enclosed in said housing;

a keypad on said housing;

a dual output device operated by said keypad and providing output signals to said telephone electronics;

a microcomputer also enclosed in said housing, said microcomputer having an associated memory including volatile memory means connected to said microprocessor for receiving and storing instructions, fixed logic means for controlling logical connections between said microprocessor and said associated memory, and system integrity processor means with an associated ROM for storing initial instructions for said microprocessor, said microprocessor also receiving outputs from said dual output device and said microprocessor means selectively providing inputs to said telephone dialer;

a communications processor logically connected to said microprocessor and said keypad for providing an interface between said microprocessor and said keypad;

switch means for selecting said telephone electronics when there is a power disconnect to said microprocessor;

modem means for communicating to remote computers via telephone lines, said modem means being logically interfaced with said communications processor and said microprocessor; and a display driven by said microprocessor, whereby said microprocessor means is programmable by initially configuring said fixed logic means.

71. A user-friendly personal communication device as claimed in claim 70, wherein said telephone electronics provide standard telephone operations when power is disconnected from said microprocessor.

72. A user-friendly personal communication device as claimed in claim 70, wherein said microcomputer accesses a network host computer via said modem means, said network host computer communicating with information and financial services in formats used by said services and transmitting programs conforming to a format which said microprocessor understands, thereby enabling said microcomputer to communicate with said information and financial services which use formats that are incompatible with said microprocessor.

73. A user-friendly personal communication device as claimed in claim 72, further comprising watchdog timer means resettable by output from said microprocessor for providing an interrupt to said microprocessor unless reset by said microprocessor within a first predetermined time limit, said microprocessor being rebooted and said watchdog timer means being disabled unless said watchdog timer means is reset within a second predetermined time limit.

74. A user-friendly personal communication device as claimed in claim 73, further comprising:

a standard telephone handset;

detector means for detecting an off-hook condition on said handset; and timer means responsive to said off-hook detector means and signals from said microprocessor for rebooting said microprocessor if said timer means is not reset by said microprocessor within a predetermined time interval after detecting such off-hook condition.

75. A user-friendly personal communication device as claimed in claim 74, further comprising:

parity check means for providing error detection for at least a part of said memory; and logic means responsive to said parity check means for providing an interrupt to said microprocessor when said parity check means provides an error detection.

76. A user-friendly personal communication device as claimed in claim 70, further comprising a keyboard for inputting instructions and data to said microprocessor.

77. A user-friendly personal communication device as claimed in claim 76, wherein said keyboard being movable between a position retracted from said housing for use, and a position hidden within said housing when not used.

78. A user-friendly personal communication device as claimed in claim 70, wherein said keypad further includes additional programmable function keys.

79. The user-friendly personal communication device as claimed in claim 70, further comprising an accessories port for connecting peripheral accessories to said personal communication device.

80. The user-friendly personal communication device as claimed in claim 70, wherein said memory includes electrically programmable non-volatile memory devices.

81. The user-friendly personal communication device as claimed in claim 70, wherein said modem has means for detecting and distinguishing busy, call-waiting, ringing, dial, and redial tones.

82. The user-friendly personal communication device as claimed in claim 70, wherein said microprocessor is programmable at several different system levels.

83. The user-friendly personal communication device as claimed in claim 70, wherein said different system levels includes a software which is downloaded in pages from a network host terminal, a BIOS software which can be downloaded by an external computer, including such network host computer, and kernel software which is permanently resident in said memory.

84. A user-friendly personal communication device having means for operating as a personal computer and a simplified user interface, said personal communication device comprising:

a telephone dialer;

electronics for said telephone dialer;

a standard telephone keypad, said keypad providing output to said telephone dialer;

a microprocessor having an associated memory and a plurality of components, said microprocessor means being responsive to inputs from said standard telephone keypad and instructions maintained in said memory to perform computing and control functions; and fixedly programmable logic means for defining interconnections among said components of said microprocessor and said associated memory.

85. A user-friendly personal communication device as claimed in claim 84 wherein said telephone electronics provide standard telephone functioning when power is disconnected from said microprocessor.

86. A user-friendly personal communication device as claimed in claim 84, further comprising a display device, and wherein said microprocessor includes means for driving said display device.

87. A user-friendly personal communication device as claimed in claim 85, further comprising a modem, and wherein said microprocessor and said associated memory are connected to a telephone line through said modem.

88. A user-friendly personal communication device as claimed in claim 84, further comprising a second keyboard.

89. A user-friendly personal communication device as claimed in claim 84, further comprising a second hidden keyboard.

90. A user-friendly personal communication device having means for operating as a personal computer with a simplified user interface, said personal communication device comprising:

a telephone dialer;

electronics for said telephone dialer for the operation of telephone service;

a standard telephone keypad, said keypad providing output to said telephone dialer;

a microprocessor having an associated memory and a plurality of components, said microprocessor being responsive to inputs from said standard telephone keypad and instructions maintained in said memory to perform computing and control functions, said microprocessor also being responsive to inputs provided from said telephone electronics and providing control of said telephone electronics, and said associated memory incorporating both volatile and non-volatile elements so that said microprocessor and said associated memory may be programmed as a computer; and fixedly programmable logic means for defining interconnections among said components of said microprocessor and said associated memory.

91. A user-friendly personal communication device as claimed in claim 90, further comprising lapse timer means reset by output from said microprocessor for providing an interrupt to said microprocessor unless reset by said microprocessor within a first predetermined time, said microprocessor being rebooted and said lapse timer means being disabled unless said lapse timer means is reset within a second predetermined time interval.

92. A user-friendly personal communication device as claimed in claim 90, further comprising:

a standard telephone handset;

detector means for detecting an off-hook condition on said handset; and timer means responsive to said off-hook detector means and said microprocessor to reboot said microprocessor if said timer means is not reset by said microprocessor within a predetermined time interval.

93. A user-friendly personal communication device as claimed in claim 90, further comprising:

parity check means for providing error detection for at least a part of said memory; and logic means responsive to said parity check means for providing an interrupt to said microprocessor when said parity check means provides an error detection.

94. A user-friendly personal communication device as claimed in claim 90, further comprising a dual output device, wherein said keypad provides simultaneous outputs to said telephone dialer and said microprocessor through said dual output device.

95. A user-friendly personal communication device as claimed in claim 90, further comprising a second keyboard.

96. A user-friendly personal communication device as claimed in claim 90, further comprising a second hidden keyboard.

97. A user-friendly personal communication device having means for operating as a personal computer with a simplified user interface, said personal communication device comprising:

a housing configured as a conventional telephone and having a front panel comprising a telephone keypad and a display;

telephone electronics responsive to said telephone keypad and including a telephone dialer within said housing for performing conventional telephone functions;

a microprocessor within said housing, including associated memory, said microprocessor being responsive to inputs from said conventional telephone keypad and to instructions contained in said memory for performing computing and control functions such that it is capable of interacting over a telephone line with a host computer to transfer information between databases in or accessible through the host computer and the personal communication device; and fixedly programmable logic means for defining interconnections among said components of said microprocessor and said associated memory.

98. A user-friendly personal communication device as claimed in claim 97, wherein said housing is further configured to have a front panel comprising a telephone keypad with function keys.

* * * * *